(12) United States Patent
Ohno

(10) Patent No.: US 11,774,369 B2
(45) Date of Patent: Oct. 3, 2023

(54) OPTICAL IMAGING APPARATUS, OPTICAL INSPECTION APPARATUS, AND OPTICAL INSPECTION METHOD

(71) Applicant: KABUSHIKI KAISHA TOSHIBA, Tokyo (JP)

(72) Inventor: Hiroshi Ohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 17/446,610

(22) Filed: Aug. 31, 2021

(65) Prior Publication Data
US 2022/0146435 A1    May 12, 2022

(30) Foreign Application Priority Data

Nov. 6, 2020   (JP) ................. 2020-186030

(51) Int. Cl.
*G01N 21/88* (2006.01)
*G02B 27/28* (2006.01)
(Continued)

(52) U.S. Cl.
CPC ......... *G01N 21/8851* (2013.01); *G01B 11/24* (2013.01); *G02B 5/10* (2013.01);
(Continued)

(58) Field of Classification Search
CPC ........... A24C 5/01; A24C 5/46; A24C 5/1807; A24C 5/24; A24C 5/465; B31C 5/00; G01B 11/24; G01B 11/25; G01N 21/8851; G01N 2021/8845; G01N 2021/8848; G01N 21/8806; G02B 27/283; G02B 5/10;
(Continued)

(56) References Cited

U.S. PATENT DOCUMENTS

| 5,675,407 A | 10/1997 | Geng |
| 10,732,102 B2 | 8/2020 | Ohno et al. |
| 2020/0004002 A1* | 1/2020 | Tille ............... G02B 21/008 |

FOREIGN PATENT DOCUMENTS

| JP | 2008-209726 A | 9/2008 |
| JP | 2019-124542 A | 7/2019 |

OTHER PUBLICATIONS

Walton L. Howes, "Rainbow schlieren and its applications," Applied Optics, vol. 23, No. 14, pp. 2449-2460 (1984).

(Continued)

*Primary Examiner* — Tri T Ton
(74) *Attorney, Agent, or Firm* — Finnegan, Henderson, Farabow, Garrett & Dunner, LLP

(57) ABSTRACT

According to one embodiment, an optical imaging apparatus includes: an image-forming optical portion, a wavelength selection portion, and an imaging portion. The image-forming optical portion forms an image of an object by means of light beams that include a first wavelength and a second wavelength different from the first wavelength. The first wavelength selection portion has wavelength selection regions. The wavelength selection regions are an anisotropic wavelength selection opening having a different distribution of the wavelength selection regions depending on a direction along a first axis and a direction along a second axis. The imaging portion is configured to simultaneously acquire an image of the first light beam and the second light beam.

20 Claims, 10 Drawing Sheets

(51) Int. Cl.
    *G02B 5/10*          (2006.01)
    *G01B 11/24*        (2006.01)
    *G02B 5/20*          (2006.01)
    *G02B 5/30*          (2006.01)
    *G02B 27/10*        (2006.01)
    *H04N 23/12*        (2023.01)

(52) U.S. Cl.
    CPC ............... *G02B 5/206* (2013.01); *G02B 5/30* (2013.01); *G02B 27/106* (2013.01); *G02B 27/283* (2013.01); *H04N 23/12* (2023.01); *G01N 2021/8845* (2013.01); *G01N 2021/8848* (2013.01)

(58) Field of Classification Search
    CPC ...... G02B 5/206; G02B 27/106; G02B 5/201; G02B 5/30; H04N 23/12; H04N 25/701
    USPC .................................. 356/123–155, 450–521
    See application file for complete search history.

(56) References Cited

OTHER PUBLICATIONS

Jun-Sik Kim, et al., "Multiaperture telecentric lens for 3D reconstruction," Optics Letters, vol. 36, No. 7, pp. 1050-1052 (2011).

\* cited by examiner

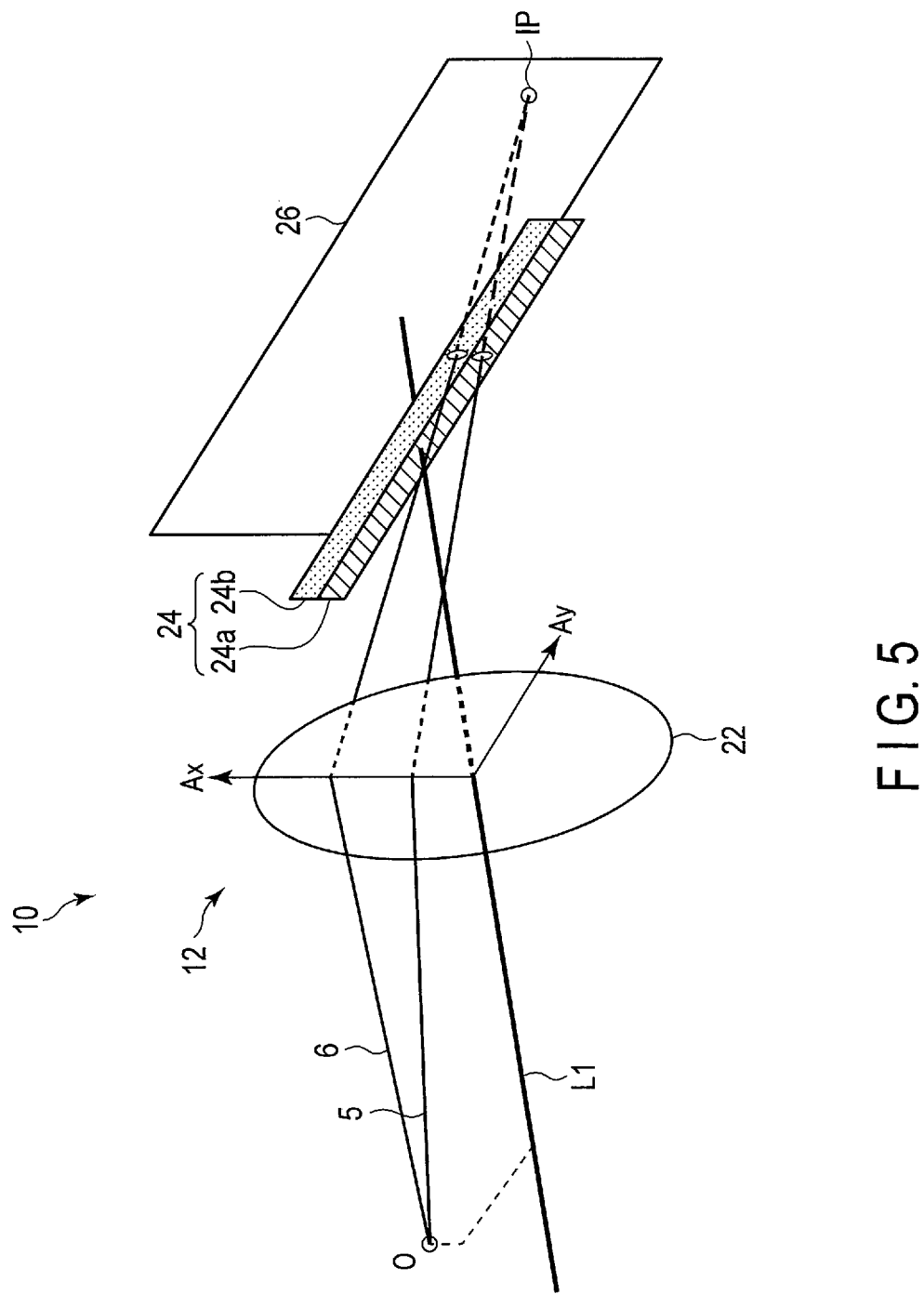
F I G. 5

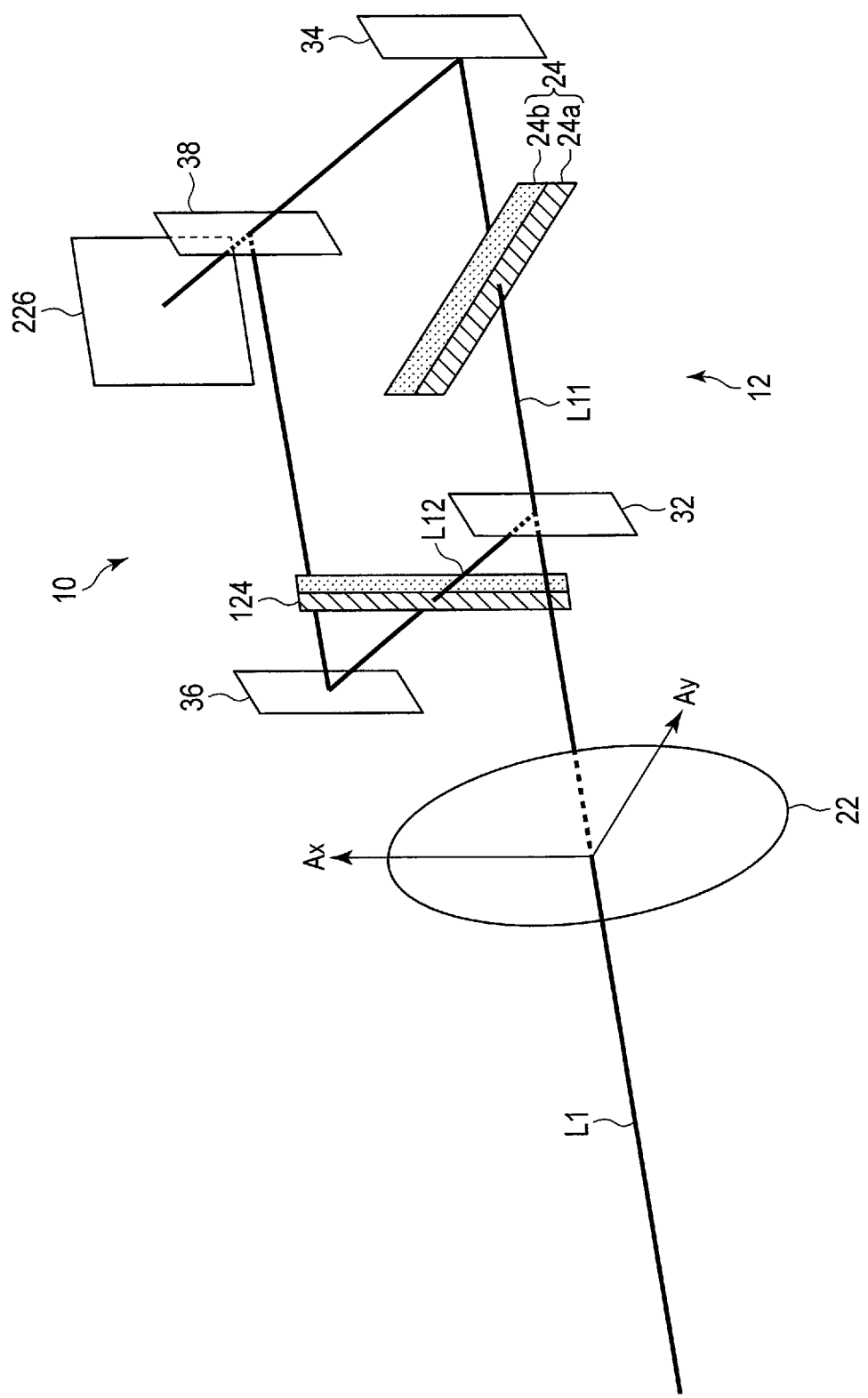
F I G. 7

OPTICAL IMAGING APPARATUS, OPTICAL INSPECTION APPARATUS, AND OPTICAL INSPECTION METHOD

CROSS-REFERENCE TO RELATED APPLICATIONS

This application is based upon and claims the benefit of priority from Japanese Patent Application No. 2020-186030, filed Nov. 6, 2020, the entire contents of all of which are incorporated herein by reference.

FIELD

Embodiments of the present invention relate to an optical imaging apparatus, an optical inspection apparatus, and an optical inspection method.

BACKGROUND

In various industries, non-contact object surface measurement has become important. As a conventional method, a technique has been known that separates light beams into spectra and illuminates an object with the light beams, acquires images separated into spectra with an imaging element, and estimates each light beam direction to acquire information about the object surface.

BRIEF DESCRIPTION OF THE DRAWINGS

FIG. 5 is a schematic perspective view that illustrates an optical inspection apparatus according to the first embodiment;

FIG. 7 is a schematic perspective view that illustrates an optical inspection apparatus according to a modification of the second embodiment;

DETAILED DESCRIPTION

Figure 1:
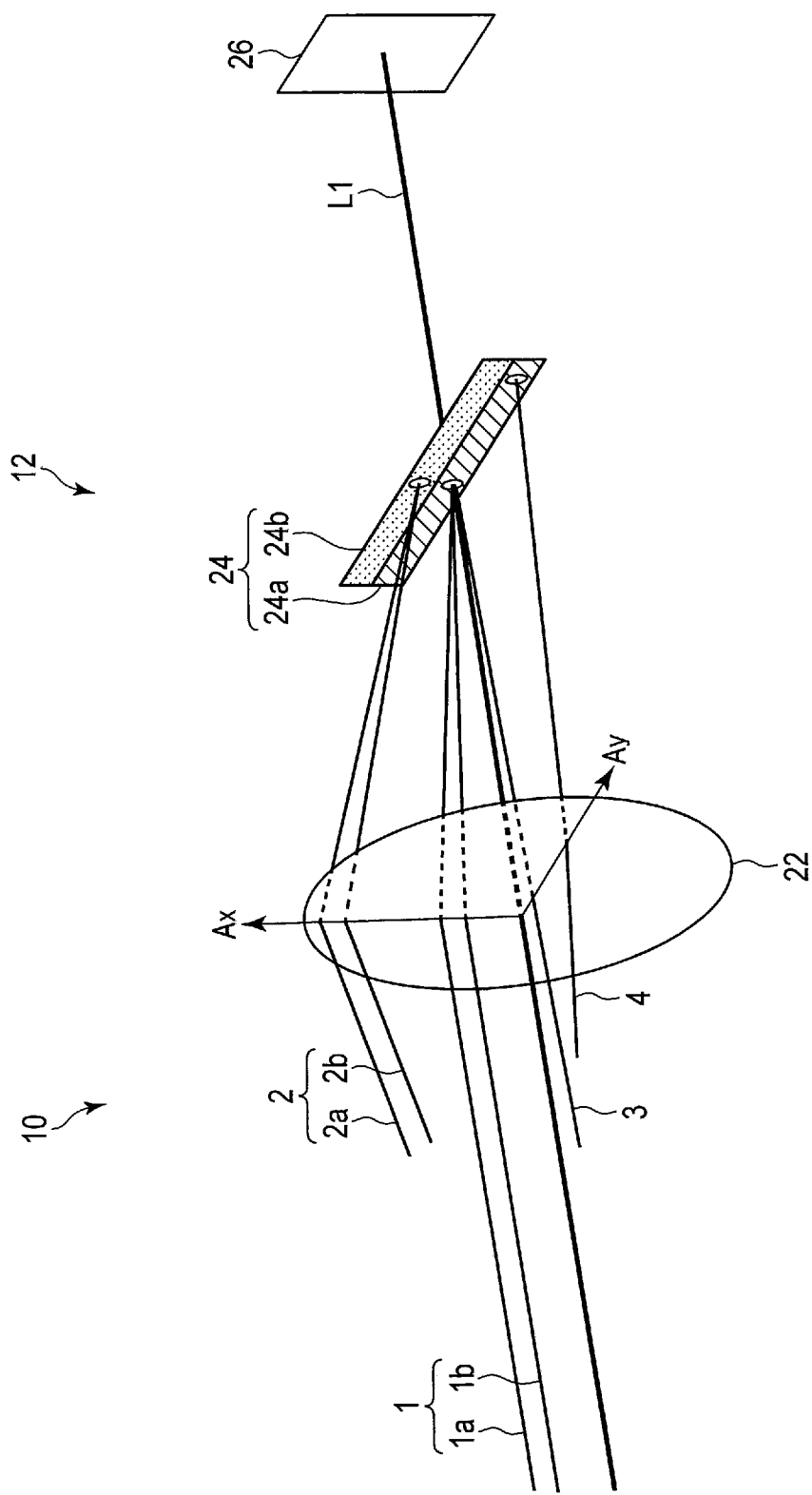
FIG. 1 is a schematic perspective view that illustrates an optical inspection apparatus according to a first embodiment.

According to one embodiment, an optical imaging apparatus includes: an image-forming optical portion, a first wavelength selection portion, and an imaging portion. The image-forming optical portion forms an image of an object by means of light beams that include a first wavelength and a second wavelength different from the first wavelength. The image-forming optical portion defines a first axis that intersects a first optical axis of the image-forming optical portion, and defines a second axis that intersects the first optical axis of the image-forming optical portion and the first axis. The first wavelength selection portion has wavelength selection regions. The wavelength selection regions are an anisotropic wavelength selection opening having a different distribution of the wavelength selection regions depending on a direction along the first axis and a direction along the second axis. A first light beam has the first wavelength. The first light beam has object-side telecentricity in an axis direction of the first axis of the image-forming optical portion and has object-side non-telecentricity in an axis direction of the second axis. The second light beam has the second wavelength. The second light beam has object-side non-telecentricity in the axis direction of the first axis and the axis direction of the second axis. The first wavelength selection portion simultaneously allows passing of the first light beam and the second light beam. The imaging portion is configured to simultaneously acquire an image of the first light beam and the second light beam.

According to one embodiment, an optical inspection method includes: imaging a first light beam that has a first wavelength and a second light beam that has a second wavelength different from the first wavelength at an imaging portion, by means of an image-forming optical portion passing through the image-forming optical portion and a wavelength selection portion from an object; and simultaneously acquiring an image of the first light beam passed through the wavelength selection portion and an image of the second light beam passed through the wavelength selection portion by means of the imaging portion. The first beam has object-side telecentricity in an axis direction of a first axis that crosses a first optical axis of the image-forming optical portion and has object-side non-telecentricity in an axis direction of a second axis that crosses the first optical axis and the first axis. The second light beam has object-side non-telecentricity in the axis direction of the first axis and the axis direction of the second axis.

According to one embodiment, an optical inspection method includes: incident of a first light beam having a first wavelength and a second light beam having a second wavelength different from the first wavelength on an object; simultaneously passing the first light beam and the second light beam through a wavelength selection portion; forming images of the first light beam and the second light beam that have been allowed to pass through the wavelength selection portion by means of the image-forming optical portion; and acquiring the images of the first light beam and the second light beam that have been allowed to pass through the wavelength selection portion by means of an imaging portion. The first light beam has object-side telecentricity in an axis direction of a first axis that crosses a first optical axis of an image-forming optical portion and has object-side non-telecentricity in an axis direction of a second axis that crosses the first optical axis and the first axis. The second light beam has object-side non-telecentricity in the axis direction of the first axis and the axis direction of the second axis.

An object of the present embodiments is to provide an optical imaging apparatuses 12, an optical inspection apparatuses 10, and an optical inspection method for acquiring information about an object surface.

Hereinafter, each of embodiments will be described with reference to the drawings. The drawings are schematic or conceptual ones, and the relationship between the thickness and width of each part, and the ratio in size between parts, etc. do not necessarily agree with the actual ones. Further, even when identical parts are depicted, the parts may be depicted with different dimensions and ratios between the drawings. In a description of each of the embodiments and each of the drawings, an element similar to an element that has been described in connection with preceding drawings is denoted by the same sign, and a detailed description of the element is appropriately omitted.

First Embodiment

Hereinafter, an optical inspection apparatus 10 according to a first embodiment will be described with reference to FIGS. 1 to 5.

FIG. 1 illustrates a schematic perspective view of the optical inspection apparatus 10 according to the present embodiment.

Figure 2:
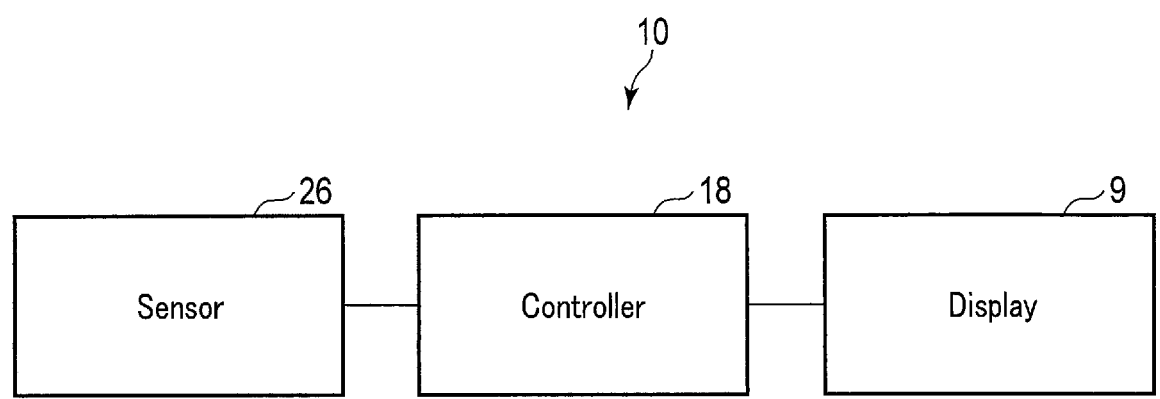
FIG. 2 is a block diagram of the optical inspection apparatus according to the first embodiment.

The optical inspection apparatus 10 according to the present embodiment includes an optical imaging apparatus 12. The optical imaging apparatus 12 includes an image-forming optical portion (image-forming optical element) 22 that has a first optical axis L1, a wavelength selection portion (first wavelength selection portion) 24, and an image sensor (imaging portion) 26. As illustrated in FIG. 2, the optical inspection apparatus 10 includes a controller 18 that is configured to control the image sensor 26. The controller 18 controls the optical imaging apparatus 12. A display 9 is connected to the controller 18 so that images acquired by the image sensor 26 of the controller 18 can be displayed. Note that the controller 18 can adjust the image-forming optical portion 22 by means of what operates electronically or what receives electronic signals and operates mechanically. Alternatively, the controller 18 can adjust the wavelength selection portion 24 by means of what switches electronically or what receives electronic signals and switches mechanically.

The controller 18 is a computer. The controller 18 physically includes memory, such as random-access memory (RAM) and read-only memory (ROM), a processor (operation circuit), such as a central processing unit (CPU), a communication interface, and an information storage, such as a hard disk. As the controller 18, a personal computer, a cloud server, a tablet terminal, and the like are exemplified. The controller 18 functions by executing programs stored in the memory with the processor.

The controller 18 can acquire images from the image sensor 26. Further, the controller 18 performs adjustments related to acquisition of images by controlling an exposure time, a frame rate, and the like. Further, the controller 18 determines a hue of an image imaged by the image sensor 26. The hue of each pixel of the image sensor 26 can be determined, for example, by the pixel value of each pixel.

Light is a type of electromagnetic wave. It is assumed that light includes X-rays, ultraviolet rays, visible light, infrared rays, a microwave, and the like. In the present embodiment, it is assumed that light is visible light and has a wavelength within a region, for example, from 400 nm to 760 nm. Preferably, light is not what is called single-color light that has a narrow wavelength range, but includes an appropriate wavelength range, such as visible light.

The image-forming optical portion 22 illustrated in FIG. 1 is, for example, an image-forming lens. That is to say, the image-forming optical portion 22 may be a spherical lens, an aspheric lens, an achromatic lens, a Fresnel lens, or the like. In FIG. 1, an image-forming lens as the image-forming optical portion 22 is schematically depicted as one lens as a representation. However, the image-forming optical portion 22 may be a lens assembly that includes a plurality of lenses. Alternatively, the image-forming optical portion 22 may be a concave mirror or a convex mirror, or a combination of a concave mirror and a convex mirror. That is to say, the image-forming optical portion 22 may be any optical element that has a function of gathering a light beam group emitted from one point of an object as an inspection subject, that is to say an object point, at a conjugate image point.

A fact that a light beam group emitted from an object point is gathered (condensed) at an image point by the image-forming optical portion 22 is referred to as image formation. Alternatively, the fact is also referred to as a transfer of an object point to an image point (conjugate point of the object point). It is thought that if an object point is infinitely distant from the image-forming optical portion 22, as illustrated in FIG. 1, a light beam group that has been emitted from an object point and reaches the image-forming optical portion 22 becomes a parallel-light light beam group. Further, a plane where conjugate points to which a parallel-light light beam group from infinity is transferred by the image-forming optical portion 22 gather is referred to as a focal plane of the image-forming optical portion 22. At this time, a conjugate image point of an object point transferred by the light beams is referred to as a focus. It is assumed that among the light beam group, a path of a light beam that is vertically incident on the focal plane is the first optical axis L1 of the image-forming optical portion 22. It is assumed that an optical axis of the image-forming optical portion 22 is a straight line that passes through the center of the image-forming optical portion 22, and the optical axis of the image-forming optical portion 22 is the first optical axis L1.

The wavelength selection portion 24 is disposed between the image-forming optical portion 22 and the image sensor 26. The wavelength selection portion 24 is disposed in the focal plane on the first optical axis L1 of the image-forming optical portion 22.

The wavelength selection portion 24 is formed into, for example, a rectangular shape in which a direction (a direction parallel to a second axis Ay described below) that perpendicularly crosses the first optical axis L1 lies in a lengthwise direction of the rectangular shape. In the present embodiment, the wavelength selection portion 24 selectively allows passing of a first wavelength and a second wavelength different from the first wavelength through the wavelength selection portion 24. The wavelength selection portion 24 has at least two or more wavelength selection regions 24a and 24b. It is assumed that among the at least two or more wavelength selection regions, one of the two wavelength selection regions 24a and 24b is a first wavelength selection region 24a, and the other is a second wavelength selection region 24b. The first wavelength selection region 24a and the second wavelength selection region 24b are each formed along the lengthwise direction of the wavelength selection portion 24. The first wavelength selection region 24a is disposed on the first optical axis L1. The first wavelength selection region 24a is adjacent to the second wavelength selection region 24b. The first wavelength selection region 24a and the second wavelength selection region 24b of the wavelength selection portion 24 are formed in translation symmetry with respect to an axis parallel to the second axis Ay.

The first wavelength selection region 24a allows passing of a light beam that has the first wavelength (first light beam) through the first wavelength selection region 24a. Here, allowing passing of a light beam means directing a light beam from an object point to an image point by transmission or reflection. In the present embodiment, it is assumed that the first wavelength selection region 24a allows regular passing of a light beam of the first wavelength through the first wavelength selection region 24a by regular transmission. Here, the regular passing means passing by the regular transmission or regular reflection. On the other hand, the first wavelength selection region 24a shields a light beam that has the second wavelength (second light beam). Here, the shielding means no allowing passing of a light beam. That is to say, the shielding means no directing a light beam from an object point to an image point. It is assumed that the first wavelength is, for example, blue light of 450 nm. However, a light beam that passes through the first wavelength selection region 24a has not only the first wavelength, but also an appropriate range of spectrum that includes a wavelength of 450 nm.

The second wavelength selection region 24b allows passing of a light beam of the second wavelength through the second wavelength selection region 24b. On the other hand, the second wavelength selection region 24b shields a light beam of the first wavelength. It is assumed that the second wavelength is red light of 650 nm. However, a light beam that passes through the second wavelength selection region 24b is not only the second wavelength, but also an appropriate range of spectrum that includes 650 nm.

The image sensor 26 includes at least one or more pixel. Preferably, the image sensor 26 includes a plurality of pixels. It is assumed that each pixel can receive light beams of at least two different wavelengths, that is to say can receive a light beam of the first wavelength and a light beam of the second wavelength. It is assumed that a plane that includes a region where the image sensor 26 is disposed is an image plane of the image-forming optical portion 22. The image sensor 26 may be an area sensor or a linear sensor. Further, each of the pixels of the image sensor 26 may include color channels of three channels of red (R), green (G), and blue (B). In the present embodiment, the image sensor 26 is an area sensor, and each pixel includes two color channels of red and blue, as illustrated in FIG. 1. That is to say, the image sensor 26 can receive blue light of a wavelength of 450 nm and red light of a wavelength of 650 nm with respective separate color channels.

In the present embodiment, a first axis Ax is set up in such a manner that the first axis Ax perpendicularly crosses the first optical axis L1 of the image-forming optical portion 22. However, the first axis Ax is not limited to this, and the first axis Ax may be any direction that crosses the first optical axis L1 of the image-forming optical portion 22. In the present embodiment, an axis direction of the first axis Ax corresponds to a direction in which the first wavelength selection region 24a and the second wavelength selection region 24b align. That is to say, the first wavelength selection region 24a and the second wavelength selection region 24b are aligned offset in the axis direction of the first axis Ax. In the present embodiment, the second axis Ay is set up in a direction that perpendicularly crosses both the first axis Ax and the first optical axis L1. However, the second axis Ay is not limited to this, and the second axis Ay may be any direction that crosses both of the first axis Ax and the first optical axis L1. In the present embodiment, it is assumed that an axis direction of the second axis Ay is along the lengthwise direction of the wavelength selection portion 24.

It is assumed that a plane where the first axis Ax and the first optical axis L1 extend is a first plane (imaginary plane), and a plane where the second axis Ay and the first optical axis L1 extend is a second plane (imaginary plane).

Figure 3:
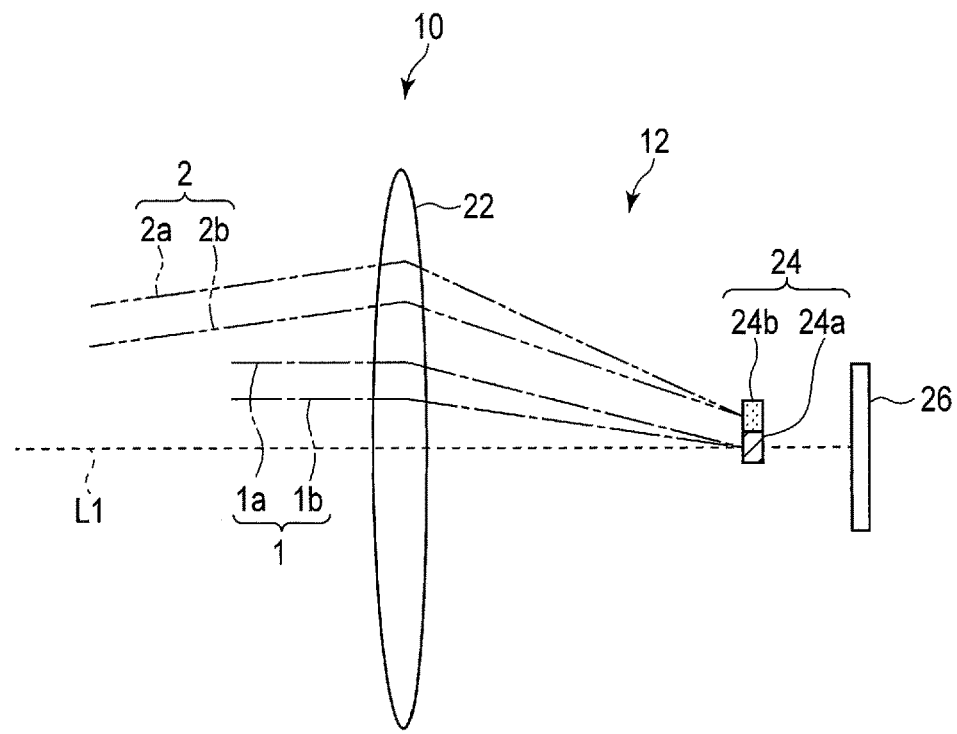
FIG. 3 is a schematic view of the optical inspection apparatus according to the first embodiment along a first plane.
Figure 4:
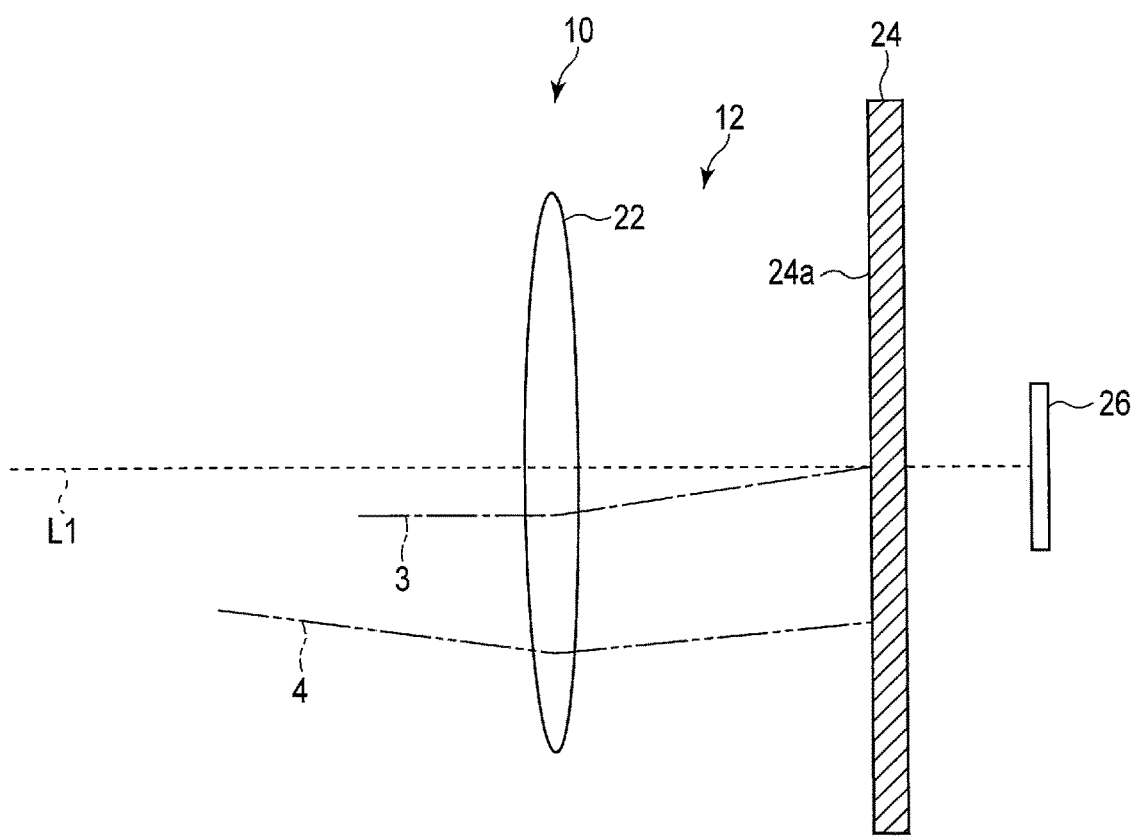
FIG. 4 is a schematic view of the optical inspection apparatus according to the first embodiment along a second plane.

FIG. 3 illustrates a cross-sectional view of the optical inspection apparatus 10 along the first plane. FIG. 4 illustrates a cross-sectional view of the optical inspection apparatus 10 along the second plane.

As illustrated in FIGS. 1 and 3, it is assumed that among light beams from the object side, light beams that are parallel to the first optical axis L1 and within the first plane are a first light beam group 1. As a representative of the first light beam group 1, two light beams of a first light beam 1a and a first light beam 1b are considered. It is assumed that among light beams from the object side, light beams that are in directions that is inclined relative to the first optical axis L1 and within the first plane are a second light beam group 2. As a representative of the second light beam group 2, two light beams of a second light beam 2a and a second light beam 2b are considered.

As illustrated in FIGS. 1 and 4, it is assumed that among light beams from the object side, light beams that are parallel to the first optical axis L1 and within the second plane are a third light beam group. As a representative of the third light beam group, a third light beam 3 is considered. It is assumed that among light beams from the object side, light beams that are in directions that is inclined relative to the first optical axis L1 and within the second plane are a fourth light beam group. As a representative of the fourth light beam group, a fourth light beam 4 is considered.

As illustrated in FIGS. 1 and 3, a plane parallel to the first plane simultaneously crosses the first wavelength selection region 24a and the second wavelength selection region 24b of the wavelength selection portion 24. That is to say, a plane parallel to the first plane crosses the at least two different wavelength selection regions 24a and 24b of the wavelength selection portion 24. As illustrated in FIGS. 1 and 4, a plane parallel to the second plane crosses the one wavelength selection region 24a of the wavelength selection portion 24. That is to say, the number of wavelength selection regions of the wavelength selection portion 24 that the first plane crosses is different from the number of wavelength selection regions of the wavelength selection portion 24 that the second plane crosses. Therefore, the wavelength selection portion 24 is non-isotropic or anisotropic, and has anisotropy. In the present embodiment, such a wavelength selection portion 24 is referred to as an anisotropic wavelength selection opening. That is to say, it is assumed that the wavelength selection portion 24 that has wavelength selection region distributions that differ according to directions of the first axis Ax and the second axis Ay is an anisotropic wavelength selection opening.

In an optical system in which the image-forming optical portion 22 makes light beams from an object point form an image at an image point, an optical system that makes main light beams parallel to the first optical axis L1 on the object side is generally referred to as an object-side telecentric optical system. In the present embodiment, if the image-forming optical portion 22 makes light beams that are substantially parallel to the first optical axis L1 on the object side form an image, it is defined that the light beams have object-side telecentricity. On the other hand, in a case to the contrary, that is to say if the image-forming optical portion 22 makes light beams that are not substantially parallel to but inclined relative to the first optical axis L1 on the object side form an image, it is defined that the light beams have object-side non-telecentricity.

Under the above configuration, an operation principle of the optical inspection apparatus 10 according to the present embodiment will be described.

The light beams 1a and 1b of the first light beam group 1 from the object side are parallel to the first optical axis L1. The light beams 1a and 1b reach a focus in a focal plane of the image-forming optical portion 22. That is to say, the first light beams 1a and 1b reach the focus. Therefore, the first light beams 1a and 1b reach the first wavelength selection region 24a of the wavelength selection portion 24 disposed in the focal plane. That is to say, the first light beams 1a and 1b that have telecentricity in the first plane reach the first wavelength selection region 24a.

The light beams 2a and 2b of the second light beam group 2 from the object side is inclined relative to the first optical axis L1 in the first plane. The light beams 2a and 2b of the second light beam group 2 are away from the focus in the focal plane of the image-forming optical portion 22, and reach the second wavelength selection region 24b. That is to say, the second light beams 2a and 2b reach the second wavelength selection region 24b. That is to say, the light beams 2a and 2b that have non-telecentricity in the first plane reach the second wavelength selection region 24b.

The light beam 3 of the third light beam group from the object side is parallel to the first optical axis L1 in the second plane. The light beam 3 of the third light beam group reaches the focus in the focal plane of the image-forming optical portion 22. Therefore, the third light beam 3 reaches the first wavelength selection region 24a of the wavelength selection portion 24 disposed in the focal plane. That is to say, the light beam 3 that has telecentricity in the second plane reaches the first wavelength selection region 24a.

The light beam 4 of the fourth light beam group from the object side inclines relative to the first optical axis L1 in the second plane. The light beam 4 of the fourth light beam group reaches the first wavelength selection region 24a that is away from the focus in the focal plane of the image-forming optical portion 22. That is to say, the fourth light beam 4 reaches the first wavelength selection region 24a. That is to say, a light beam that has non-telecentricity in the second plane reaches the first wavelength selection region 24a.

In this way, the light beams 1a and 1b that have telecentricity in the first plane and the light beams 2a and 2b that have non-telecentricity in the first plane reach the respective different wavelength selection regions. On the other hand, the light beam 3 that has telecentricity in the second plane and the light beam 4 that has non-telecentricity in the second plane both reach the same wavelength selection region 24a.

With respect to any light beam that reaches the image-forming optical portion 22 in any direction from the object side, a projection of the path projected on the first plane (see FIGS. 1 and 3) and a projection of the path projected on the second plane (see FIGS. 1 and 4) are considered. To each of the projected light beams, the characteristics described above are each similarly satisfied. That is to say, a light beam that is projected on the first plane and has telecentricity, and a light beam that is projected on the first plane and has non-telecentricity reach different wavelength selection regions of the wavelength selection portion 24. On the other hand, a light beam that is projected on the second plane and has telecentricity, and a light beam that is projected on the second plane and has non-telecentricity both reach the same wavelength selection region 24a.

Due to what has been described above, the optical imaging apparatus 12 of the optical inspection apparatus 10 according to the present embodiment operates as follows:

If blue light (light beams of the first wavelength) of an object is imaged by the image sensor 26 of the optical inspection apparatus 10 according to the present embodiment, the blue light passes through the first wavelength selection region 24a of the wavelength selection portion 24. At this time, the first wavelength selection region 24a of the wavelength selection portion 24 shields red light (light beams of the second wavelength). Blue light has telecentricity in an axis direction of the first axis Ax. That is to say, the optical inspection apparatus 10 can acquire a telecentric image of blue light with the image sensor 26. A telecentric image has an advantage that a telecentric image does not depend on farness and nearness of an object. Therefore, an actual size of an object can be acquired with respect to an axis direction of the first axis Ax. On the other hand, blue light has non-telecentricity in an axis direction of the second axis Ay. This can be paraphrased as having entocentricity. That is to say, an entocentric image can be acquired that has an angle of view that is wide in an axis direction of the second axis Ay, and has perspectiveness.

If red light of an object is imaged by the image sensor 26 of the optical inspection apparatus 10, the red light passes through the second wavelength selection region 24b of the wavelength selection portion 24. At this time, the second wavelength selection region 24b of the wavelength selection portion 24 shields blue light. Red light has non-telecentricity in both an axis direction of the first axis Ax and an axis direction of the second axis Ay. This can be paraphrased as having entocentricity. That is to say, the optical inspection apparatus 10 can acquire an entocentric image of red light with the image sensor 26. Therefore, the optical inspection apparatus 10 can acquire an image that has a wide angle of view.

In this way, the image sensor 26 of the optical inspection apparatus 10 according to the present embodiment simultaneously acquires an image of blue light (that corresponds to, for example, regular-reflection light) and an image of red light (that corresponds to, for example, scattered light), along a direction of the first axis Ax. Then the controller 18 determines a hue of an object, based on the images acquired by the image sensor 26. Here, if there is a foreign matter or minute protrusions and recesses of scales close to a wavelength of light on a surface of an object of an inspection subject (that is referred to as an object surface), light beams are scattered, and the image sensor 26 acquires an image as red light. Therefore, the optical imaging apparatus 12 of the optical inspection apparatus 10 according to the present embodiment can be used to acquire information about an object surface, and inspect the object surface.

Further, the optical imaging apparatus 12 of the optical inspection apparatus 10 according to the present embodiment can acquire an image of blue light with an angle of view that exceeds a lens diameter of the image-forming optical portion 22 and an image of red light with an angle of view that exceeds a lens diameter of the image-forming optical portion 22, along a direction of the first axis Ax and a direction of the second axis Ay. Therefore, the optical imaging apparatus 12 of the optical inspection apparatus 10 according to the present embodiment can acquire an image with a large angle of view, while acquiring information about an object surface.

An optical inspection method of an object using the optical imaging apparatus 12 of the optical inspection apparatus 10 will be briefly described.

Light beams from an object that include a first wavelength (for example, blue light) and a second wavelength (for example, red light) are made to reach the wavelength selection portion 24 by the image-forming optical portion 22. The wavelength selection portion 24 selectively allows passing of a light beam of the first wavelength and a light beam of the second wavelength through the wavelength selection portion 24 to form images at the image sensor 26. The wavelength selection portion 24 allows passing of a light beam of the first wavelength through the first wavelength selection region 24a of the wavelength selection portion 24, and allows passing of a light beam of the second wavelength through the second wavelength selection region 24b of the wavelength selection portion 24. The light beam of the first wavelength has object-side telecentricity in an axis direction of the first axis Ax that crosses the first optical axis L1 of the image-forming optical portion 22 and has object-side non-telecentricity in an axis direction of the second axis Ay that crosses the first optical axis L1 and the first axis Ax. The light beam of the second wavelength has object-side non-telecentricity in an axis direction of the first axis Ax and the axis direction of the second axis Ay. At this time, the first wavelength selection region 24a shields passing of a light beam of the second wavelength through the first wavelength selection region 24a, and the second wavelength selection region 24b shields passing of a light beam of the first wavelength through the second wavelength selection region 24b. Then images of light beams of the first wavelength and the second wavelength that have passed through the wavelength selection portion 24 are simultaneously acquired by the image sensor 26.

In this way, the optical imaging apparatus 12 of the optical inspection apparatus 10 according to the present embodiment can acquire information about an object surface without separating light beams made to be incident on the image-forming optical portion 22, into spectra, on the object side that is a side opposite the wavelength selection portion 24.

An optical imaging apparatus 12 of an optical inspection apparatus 10 illustrated in FIG. 5 has the same structure as the optical imaging apparatus 12 of the optical inspection apparatus 10 illustrated in FIG. 1. As illustrated in FIG. 5, it is assumed that light beams 5 and 6 from an object point O are imaged at an image point IP on an image sensor 26.

Here, it is assumed that among the light beams 5 and 6 from the object point O, a light beam that is incident on an image-forming optical portion 22 in parallel to a first optical axis L1 in a first plane is a fifth light beam 5. Further, it is assumed that a light beam that is incident on the image-forming optical portion 22 while inclined relative to the first optical axis L1 in the first plane and inclined relative to the first optical axis L1 in a second plane is a sixth light beam 6.

The fifth light beam 5 reaches a first wavelength selection region 24a, and a light beam that has a first wavelength passes through the first wavelength selection region 24a and reaches the image point IP. That is to say, the fifth light beam 5 is imaged as blue light by the image sensor 26. The sixth light beam 6 reaches a second wavelength selection region 24b, and a light beam that has a second wavelength passes through the second wavelength selection region 24b and reaches the image point IP. That is to say, the sixth light beam 6 is imaged as red light by the image sensor 26. Therefore, a controller 18 can identify a light beam direction that passes through a wavelength selection portion 24 from the object point O, based on a color of an image acquired by the image sensor 26. That is to say, the controller 18 acquires a direction of a light beam relative to a first axis Ax, based on a hue of an image acquired by the image sensor 26.

Due to what has been described above, the optical imaging apparatus 12 of the optical inspection apparatus 10 according to FIG. 5 operates as follows:

If blue light (light beams of a first wavelength) from an object is imaged by the image sensor 26 of the optical inspection apparatus 10 according to the present embodiment, the blue light passes through the first wavelength selection region 24a of the wavelength selection portion 24. At this time, the first wavelength selection region 24a of the wavelength selection portion 24 shields red light (light beams of the second wavelength). Blue light has telecentricity in an axis direction of the first axis Ax. That is to say, the optical inspection apparatus 10 can acquire a telecentric image of blue light with the image sensor 26. A telecentric image has an advantage that a telecentric image does not depend on farness and nearness of an object O. Therefore, an actual size of an object O can be acquired with respect to an axis direction of the first axis Ax. On the other hand, blue light has non-telecentricity in an axis direction of the second axis Ay. This can be paraphrased as having entocentricity. That is to say, an entocentric image can be acquired that has an angle of view that is wide in an axis direction of the second axis Ay, and has perspectiveness.

If red light (light beams of the second wavelength) from an object is imaged by the image sensor 26 of the optical inspection apparatus 10, the red light passes through the second wavelength selection region 24b of the wavelength selection portion 24. At this time, the second wavelength selection region 24b of the wavelength selection portion 24 shields blue light. Red light has non-telecentricity in both an axis direction of the first axis Ax and an axis direction of the second axis Ay. This can be paraphrased as having entocentricity. That is to say, the optical inspection apparatus 10 can acquire an entocentric image of red light with the image sensor 26. Therefore, the optical inspection apparatus 10 can acquire an image that has a wide angle of view.

Further, a surface state or a surface shape at an object point O changes a light arrangement distribution of light beams from the object point O. The wavelength selection portion 24 of the optical inspection apparatus 10 according to the present embodiment selectively allows passing of blue light or red light among light beams from an object point O through the wavelength selection portion 24, according to directions of the light beams, and the blue light or the red light is imaged by the image sensor 26. Therefore, a component ratio of the blue light and the red light received by pixels of the image sensor 26 changes according to a surface state or a surface shape of the object point O. That is to say, the controller 18 of the optical inspection apparatus 10 performs processing that estimates a surface state or a surface shape of the object point O, based on a hue of an image imaged by the image sensor 26.

Due to the above, a telecentric image in an axis direction of the first axis Ax and an entocentric image in an axis direction of the second axis Ay can be simultaneously acquired by the image sensor 26 of the optical imaging apparatus 12 of the optical inspection apparatus 10 according to the present embodiment. Further, the controller 18 of the optical imaging apparatus 12 can estimate a surface state or a surface shape of an object, based on a hue of an imaged image.

According to the present embodiment, the optical imaging apparatus 12, the optical inspection apparatus 10, and the optical inspection method for acquiring information about an object surface can be provided.

In the present embodiment, a light beam that the first wavelength selection region 24a allows passing through the first wavelength selection region 24a is blue light, and a light beam that the first wavelength selection region 24a shields is red light. A light beam that the second wavelength selection region 24b allows passing through the second wavelength selection region 24b is red light, and a light beam that the second wavelength selection region 24b shields is blue light. A light beam that the first wavelength selection region 24a allows passing through the first wavelength selection region 24a may be red light, and a light beam that the first wavelength selection region 24a shields may be blue light, and a light beam that the second wavelength selection region 24b allows passing through the second wavelength selection region 24b may be blue light, and a light beam that the second wavelength selection region 24b shields may be red light.

The first wavelength selection region 24a may shield all light beams, irrespective of wavelengths. That is to say, the first wavelength selection region 24a may shield both a light beam of a first wavelength and a light beam of a second wavelength. In this case, an image of blue light (light beam of the first wavelength) is not imaged. On the other hand, a light beam of red light (light beam of the second wavelength) that has non-telecentricity passes through the second wavelength selection region 24b, and is imaged. Therefore, the controller 18 can extract a non-telecentric image by means of the red light (second wavelength). That is to say, an image in which among light beams from an object, light beams along the first optical axis L1 are shielded can be acquired. Therefore, if a light beam intensity along the first optical axis L1, for example, is strong, and there is a halation in an imaged image, the halation can be decreased. Further, there is an advantage that if an object surface is a diffusion surface, and scattered light, with the scattering center being the first optical axis L1 (a light arrangement distribution is in axis symmetry with respect to the first optical axis L1), is incident on the image-forming optical portion 22, a large scattering angle component can be extracted. Therefore, a surface state of an object surface can be estimated.

Note that in the present embodiment, wavelengths of green light are excluded from the first wavelength selection region 24a and the second wavelength selection region 24b of the two colors of the wavelength selection portion 24. The reason is that an overlapping portion of wavelengths of blue light and green light, and an overlapping portion of wavelengths of green light and red light are larger than an overlapping portion of wavelengths of blue light and red light. In other words, the reason is that wavelengths of green light are between wavelengths of blue light and wavelengths of red light, and thus sectioning of wavelengths of blue light and wavelengths of red light is easier than using wavelengths of green light. A range of the first wavelength and a range of the second wavelength are not limited to the wavelengths described above and may be any wavelength if the range of the first wavelength and the range of the second wavelength are different wavelengths. Further, it is assumed that spectra of light beams that pass through different wavelength selection regions of the wavelength selection portion 24 are different. If the spectra are different, hues are different.

As described below, if each pixel of an image sensor 26 includes color channels of, for example, three channels of R, G, and B, and a wavelength selection portion 24 includes wavelength selection regions 24a, 24b, and 24c that correspond to three wavelengths (see FIG. 8), green light can be acquired in addition to blue light and red light.

In the present embodiment, an example is described in which the image sensor 26 that includes an appropriate wavelength range, such as blue light and red light, is used. Using a multispectral camera or a hyperspectral camera as the image sensor 26 allows colors of, for example, a wavelength region of visible light from 400 nm to 760 nm to be separated and an image to be acquired for each of appropriate wavelengths (for example, a wavelength of 5 nm in case of a hyperspectral camera). Therefore, using a multispectral camera or a hyperspectral camera as the image sensor 26, as described above, allows information about an object surface to be acquired. In this case, the wavelength selection portion 24 is not only divided into the two wavelength selection regions 24a and 24b, but also may be divided into a plurality of wavelength selection regions.

Second Embodiment

Hereinafter, an optical inspection apparatus according to the present embodiment will be described with reference to FIG. 6.

Figure 6:
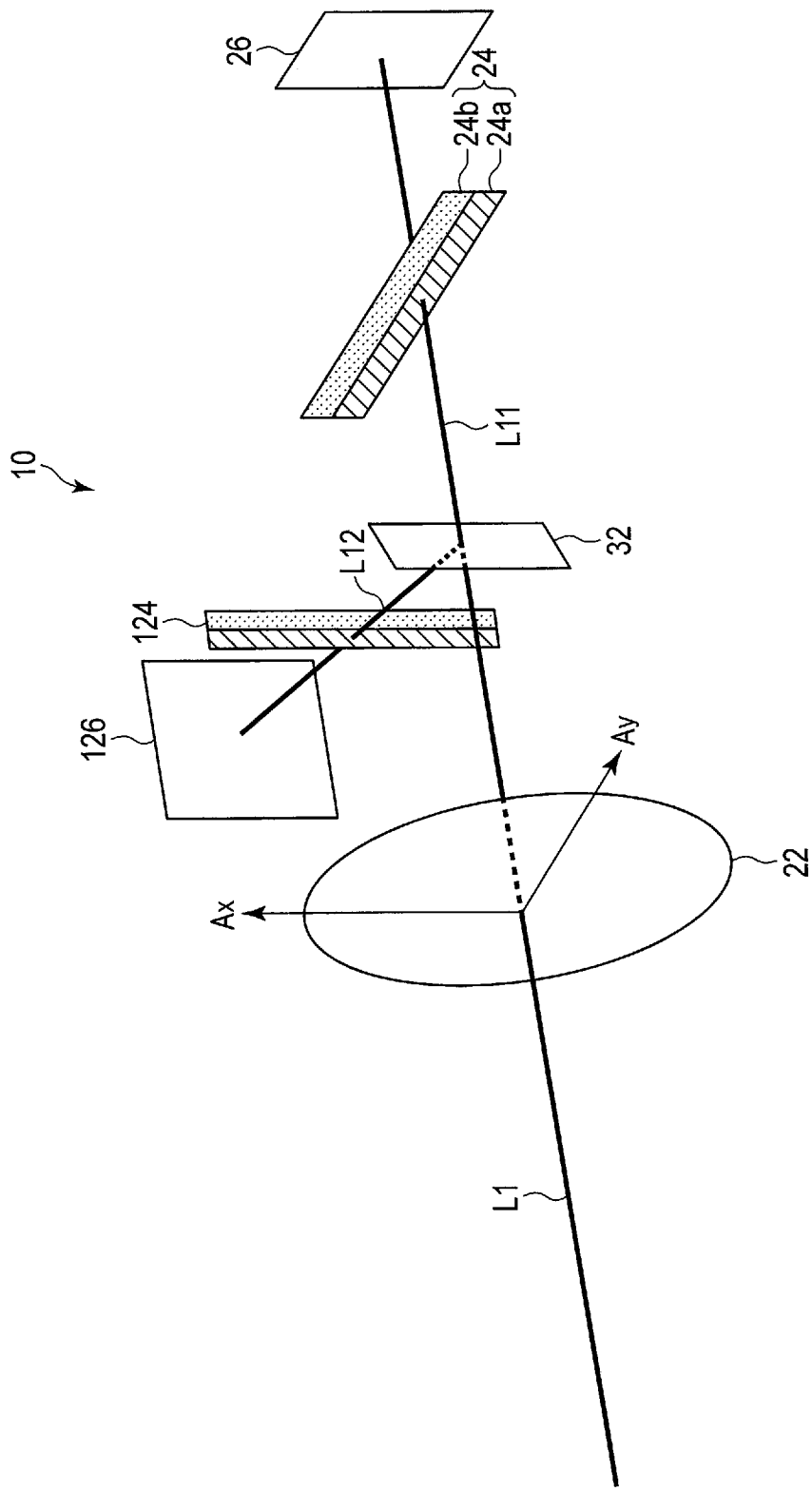
FIG. 6 is a schematic perspective view that illustrates an optical inspection apparatus according to a second embodiment.

FIG. 6 illustrates a schematic perspective view of an optical inspection apparatus 10 according to the present embodiment. A basic configuration of an optical imaging apparatus 12 of the optical inspection apparatus 10 according to the present embodiment is similar to a basic configuration of the optical imaging apparatus 12 according to the first embodiment.

The optical imaging apparatus 12 includes a beam splitter 32, a wavelength selection portion (second wavelength selection portion) 124 as an anisotropic wavelength selection opening, and an image sensor 126, in addition to the configuration of the first embodiment. The image sensor 126 is controlled by a controller 18. The image sensor 126 is synchronized by control of the controller 18 so that the image sensor 126 and the image sensor 26 simultaneously acquire images.

The beam splitter 32 is disposed on a first optical axis L1 between an image-forming optical portion 22 and a wavelength selection portion 24. It is assumed that the beam splitter 32 is, for example, a non-polarizing beam splitter. However, the beam splitter 32 is not limited to a non-polarizing beam splitter, and may be a polarizing beam splitter. The beam splitter 32 may be anything that splits light beams. It is assumed that a light beam that passes through the beam splitter 32 has an optical axis L11, and a light beam reflected by the beam splitter 32 has an optical axis L12.

The wavelength selection portions 24 and 124 have the same configuration. Therefore, the wavelength selection portions 24 and 124 are both anisotropic wavelength selection openings. The wavelength selection portion 24 is in symmetry (translation symmetry) with respect to an axis parallel to a second axis Ay. The wavelength selection portion 124 is in symmetry (translation symmetry) with respect to an axis parallel to a first axis Ax. That is to say, the wavelength selection portion 24 has a lengthwise direction in a direction along the second axis Ay. The wavelength selection portion 124 has a lengthwise direction in a direction along the first axis Ax. The number that crosses wavelength selection regions in a direction along an axis direction parallel to the first optical axis L1 is different from the number that crosses the wavelength selection regions in a direction along the first axis Ax. Therefore, the wavelength selection portion 124 is non-isotropic or anisotropic, and has anisotropy.

The image sensors 26 and 126 have the same configuration. The image sensor 126 is disposed in parallel to the wavelength selection portion 124, that is to say perpendicularly to the optical axis L12.

Under the above configuration, an operation principle of the optical inspection apparatus 10 according to the present embodiment will be described.

Blue light that passes through the image-forming optical portion 22, the beam splitter 32, and the wavelength selection portion 24 has telecentricity in an axis direction of the first axis Ax. That is to say, a telecentric image can be acquired due to blue light. A telecentric image has an advantage that a telecentric image does not depend on farness and nearness of an object. Therefore, an actual size can be acquired with respect to an axis direction of the first axis Ax. On the other hand, blue light has non-telecentricity in an axis direction of the second axis Ay. This can be paraphrased as having entocentricity. That is to say, an entocentric image can be acquired that has an angle of view that is wide in an axis direction of the second axis Ay, and has perspectiveness.

Blue light that passes through the image-forming optical portion 22, is split by the beam splitter 32, and passes through the wavelength selection portion 124 has telecentricity in an axis direction of the second axis Ay. That is to say, a telecentric image can be acquired due to blue light. A telecentric image has an advantage that a telecentric image does not depend on farness and nearness of an object. Therefore, an actual size can be acquired with respect to an axis direction of the second axis Ay. On the other hand, blue light has non-telecentricity in an axis direction of the first axis Ax. This can be paraphrased as having entocentricity. That is to say, an entocentric image can be acquired that has an angle of view that is wide in an axis direction of the first axis Ax, and has perspectiveness.

A combination of the wavelength selection portion 24 that has a lengthwise direction in a direction parallel to an axis direction of the second axis Ay of the image-forming optical portion 22, and the image sensor 26, and a combination of the wavelength selection portion 124 that has a lengthwise direction in a direction parallel to an axis direction of the first axis Ax of the image-forming optical portion 22, and the image sensor 126 allow the optical inspection apparatus 10 according to the present embodiment to simultaneously acquire both a telecentric image and an entocentric image, in a direction along the first axis Ax and in a direction along the second axis Ay, from the object side. Further, the controller 18 of the optical imaging apparatus 12 of the optical inspection apparatus 10 according to the present embodiment can acquire a light beam direction on the object side, based on a hue acquired by the image sensors 26 and 126.

According to the present embodiment, the optical imaging apparatus 12, the optical inspection apparatus 10, and the optical inspection method for acquiring information about an object surface can be provided.

(First Modification)

FIG. 7 illustrates a schematic perspective view of an optical inspection apparatus 10 according to a first modification of the present embodiment.

A basic configuration of an optical imaging apparatus 12 of the optical inspection apparatus 10 according to the present modification is similar to a basic configuration of the optical imaging apparatus 12 according to the second embodiment.

With reference to the configuration of the first embodiment, as described in the second embodiment, the optical imaging apparatus 12 according to the present modification includes a beam splitter 32, a wavelength selection portion 124, mirrors 34 and 36, a polarizing beam splitter 38, and an image sensor 226, in addition to the configuration of the first embodiment. The image sensor 226 is controlled by a controller 18.

The beam splitter 32 according to the present modification is disposed on a first optical axis L1 between an image-forming optical portion 22 and a wavelength selection portion 24. The wavelength selection portion 24 is disposed between the mirror 34 and the polarizing beam splitter 32. The wavelength selection portion 124 is disposed between the mirror 36 and the polarizing beam splitter 32. The polarizing beam splitter 38 is disposed on light paths of light reflected by the mirrors 34 and 36.

The beam splitter 32 is a polarizing beam splitter, and splits, for example, polarized-light components that are orthogonal to each other. Further, the image sensor 226 is a polarized-light image sensor, and identifies and receives two polarized-light components that are orthogonal to each other, at each pixel.

One polarized light component (first polarized-light component) of two polarized-light components split by the polarizing beam splitter 32 is made to be incident on the wavelength selection portion 24 on an optical axis L11. The other polarized light component (a second polarized-light component different from the first polarized-light component) is made to be incident on the wavelength selection portion 124 on an optical axis L12.

The mirror 34 directs light beams that has passed through the wavelength selection portion 24 (light of a predetermined polarized-light component) to the another polarizing beam splitter 38. The mirror 36 directs light beams that has passed through the wavelength selection portion 124 (light of a polarized-light component different from the predetermined polarized-light component) to the another polarizing beam splitter 38. The another polarizing beam splitter 38 multiplexes the polarized-light components of the two light beams. Therefore, the two multiplexed light beams become light beams that have the same optical axis, and are made to be incident on the polarized-light image sensor 226.

While the polarized-light image sensor 226 is controlled by the controller 18, the polarized-light image sensor 226 identifies and receives two polarized-light components that are orthogonal to each other, at each pixel.

Due to the above, both a telecentric image and an entocentric image, from the object side, in a direction along a first axis Ax and in a direction along a second axis Ay, can be simultaneously acquired by the one polarized-light image sensor 226. Further, the controller 18 of the optical imaging apparatus 12 of the optical inspection apparatus 10 according to the present embodiment can acquire a light beam direction on the object side, based on a hue acquired by the image sensors 26 and 126.

According to the present modification, the optical imaging apparatus 12, the optical inspection apparatus 10, and the optical inspection method for acquiring information about an object surface can be provided.

Third Embodiment

Hereinafter, an optical inspection apparatus according to the present embodiment will be described with reference to FIG. 8.

Figure 8:
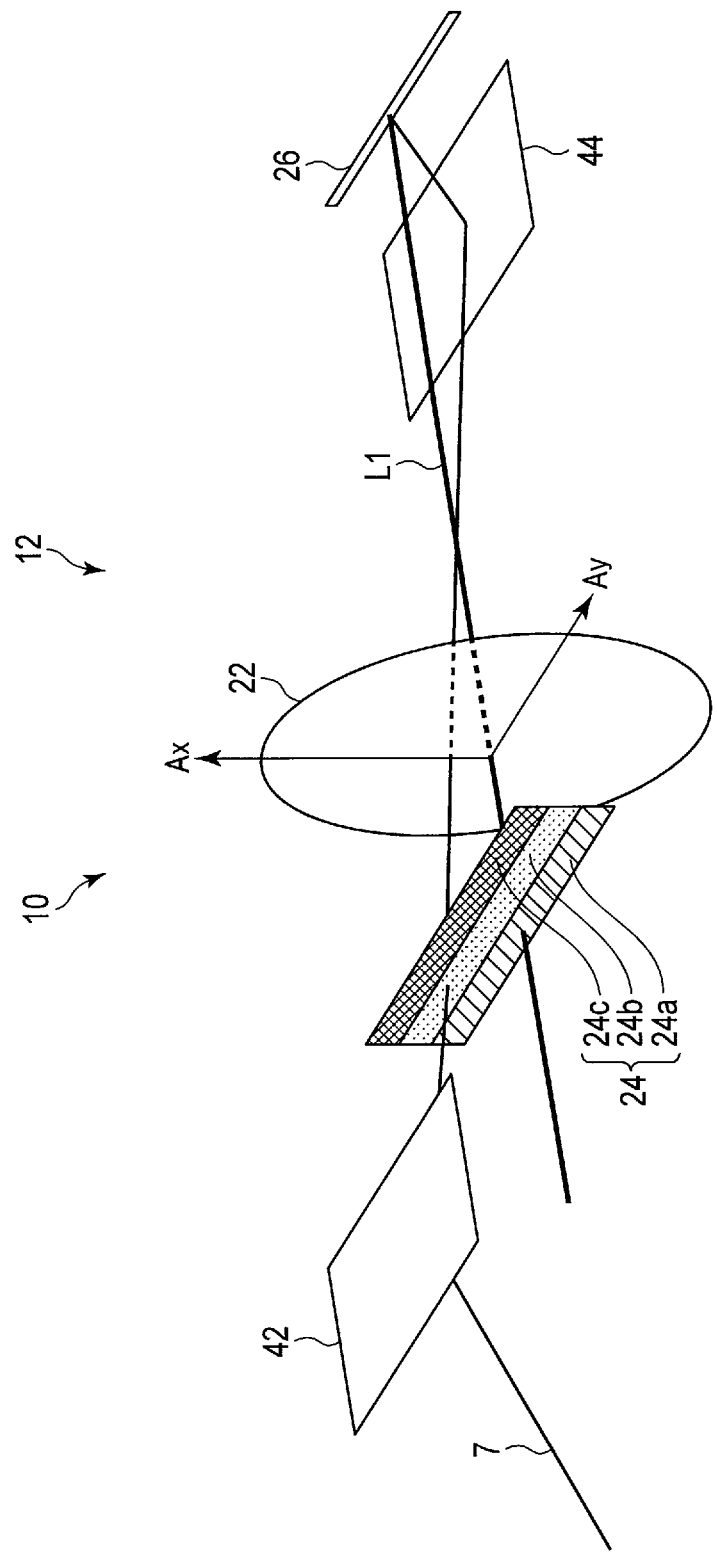
FIG. 8 is a schematic perspective view that illustrates an optical inspection apparatus according to a third embodiment.

FIG. 8 illustrates a schematic perspective view of an optical inspection apparatus 10 according to the present embodiment. A basic configuration of an optical imaging apparatus 12 of the optical inspection apparatus 10 according to the present embodiment is similar to a basic configuration of the optical imaging apparatus 12 according to the first embodiment.

In the present embodiment, a wavelength selection portion 24 is disposed closer to an object as an inspection subject than an image-forming optical portion 22 is disposed. The wavelength selection portion 24 is disposed on a first optical axis L1 of the image-forming optical portion 22. A first mirror 42 is disposed closer to the object than the image-forming optical portion 22 and the wavelength selection portion 24 are disposed. A second mirror 44 is disposed between the image-forming optical portion 22 and an image sensor 26. A normal-line direction of a reflection surface of the first mirror 42 is parallel to a first axis Ax. A normal-line direction of a reflection surface of the second mirror 44 is parallel to the first axis Ax.

The number of wavelength selection regions of the wavelength selection portion 24 that a first plane crosses is different from the number of wavelength selection regions of the wavelength selection portion 24 that a second plane crosses. Therefore, the wavelength selection portion 24 is non-isotropic or anisotropic, and has anisotropy. Therefore, the wavelength selection portion 24 is an anisotropic wavelength selection opening. In the present embodiment, the wavelength selection portion 24 has a lengthwise direction along a second axis Ay, and is divided into at least three different regions along a direction along the first axis Ax. In the present embodiment, the wavelength selection portion 24 includes three different wavelength selection regions 24a, 24b, and 24c. The three different wavelength selection regions 24a, 24b, and 24c are a first wavelength selection region 24a, a second wavelength selection region 24b, and a third wavelength selection region 24c. In the present embodiment, the first wavelength selection region 24a allows passing of blue light through the first wavelength selection region 24a, and shields green light and red light. The second wavelength selection region 24b allows passing of red light through the second wavelength selection region 24b, and shields blue light and green light. The third wavelength selection region 24c allows passing of green light through the third wavelength selection region 24c, and shields red light and blue light. Note that here, it is assumed that the first wavelength selection region 24a, for example, is disposed on the first optical axis L1 of the image-forming optical portion 22.

The image sensor 26 is a linear sensor. It is assumed that a light beam from an object is a seventh light beam 7. The seventh light beam 7 from an object is reflected by the first mirror 42, and is made to be incident on the image sensor 26 through the wavelength selection region 24a, 24b, or 24c of the wavelength selection portion 24, the image-forming optical portion 22, and the second mirror 44.

In the first plane where the first axis Ax and the first optical axis L1 extend, the image sensor 26 can be considered as a point. In the present embodiment, in the first plane, an image of an only one region (only one object point) of an object that can be considered as substantially a point is image formed at the linear sensor 26. In this case, it can be said that in the first plane, blue light that is incident on the wavelength selection portion 24 from an only one object point and passes through the wavelength selection region 24a, red light that is incident on the wavelength selection portion 24 from the only one object point and passes through the wavelength selection region 24b, and green light that is incident on the wavelength selection portion 24 from the only one object point and passes through the wavelength selection region 24c have different directions. That is to say, if the image sensor 26 is a linear sensor, a light beam direction can be identified by the controller 18, based on a hue in the first plane, even if the wavelength selection regions 24a, 24b, and 24c are disposed closer to the object than the image-forming optical portion 22 is disposed.

Light beams that do not directly reach the image-forming optical portion 22 from an object point are indirectly directed to the linear sensor 26 by the first mirror 42 and the second mirror 44. Therefore, the optical imaging apparatus 12 of the optical inspection apparatus 10 according to the present embodiment can identify directions of light beams of a wide range.

In this way, the optical imaging apparatus 12 of the optical inspection apparatus 10 according to the present embodiment can acquire information about an object surface.

An optical inspection method of an object using the optical imaging apparatus 12 of the optical inspection apparatus 10 will be briefly described.

Light beams that include a first wavelength (for example, blue light) and a second wavelength (for example, red light) are made to be incident on an object. At this time, a light beam of the first wavelength is allowed to pass through the first wavelength selection region 24a of the wavelength selection portion 24, and simultaneously a light beam of the second wavelength is allowed to pass through the first wavelength selection region 24a of the wavelength selection portion 24, and simultaneously a light beam of the second wavelength. The light beam of the first wavelength has object-side telecentricity in an axis direction of the first axis Ax that crosses the first optical axis L1 of the image-forming optical portion 22 and has object-side non-telecentricity in an axis direction of the second axis Ay that crosses the first optical axis L1 and the first axis Ax. The light beam of the second wavelength has object-side non-telecentricity in an axis direction of the first axis Ax and the axis direction of the second axis Ay. Then the image-forming optical portion 22 makes the light beams of the first wavelength and the second wavelength that have passed through the wavelength selection portion 24 form images, and the images of the light beams of the first wavelength and the second wavelength are simultaneously acquired by the image sensor 26.

In this way, according to the present embodiment, the optical imaging apparatus 12, the optical inspection apparatus 10, and the optical inspection method for acquiring information about an object surface can be provided.

Fourth Embodiment

Hereinafter, an optical inspection apparatus 10 according to the present embodiment will be described with reference to FIGS. 9 and 10.

Figure 9:
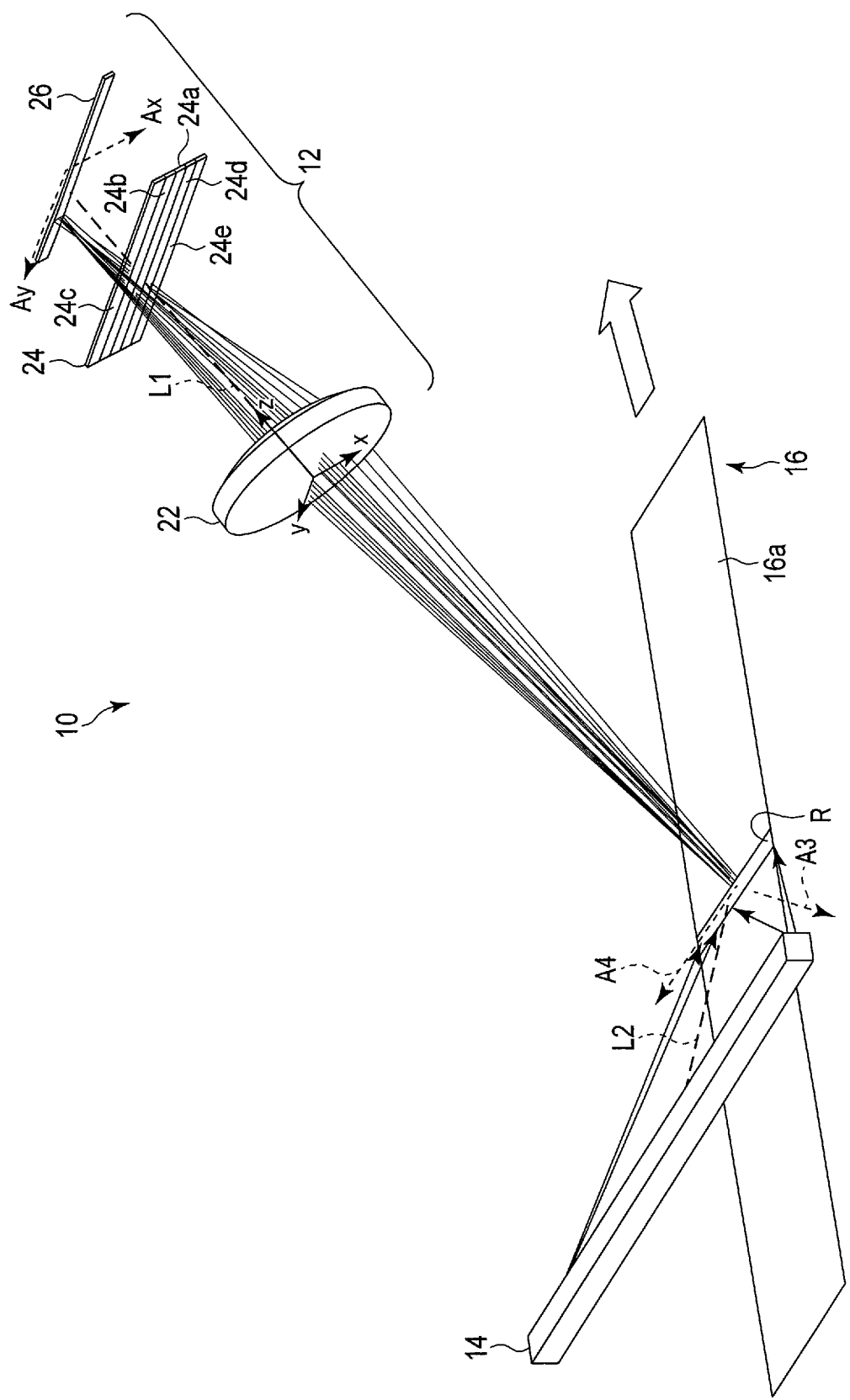
FIG. 9 is a schematic perspective view that illustrates an optical inspection apparatus according to a fourth embodiment.

FIG. 9 illustrates a schematic perspective view of the optical inspection apparatus 10 according to the present embodiment. FIG. 10 illustrates a block diagram of the optical inspection apparatus 10.

As illustrated in FIG. 9, the optical inspection apparatus 10 according to the present embodiment includes an optical imaging apparatus 12, an illumination portion 14, and a conveyance portion 16. For example, positions of the optical imaging apparatus 12 and the illumination portion 14 are fixed to a floor surface (not illustrated), and a conveyance path 16a of the conveyance portion 16 moves relative to the optical imaging apparatus 12 and the illumination portion 14.

Figure 10:
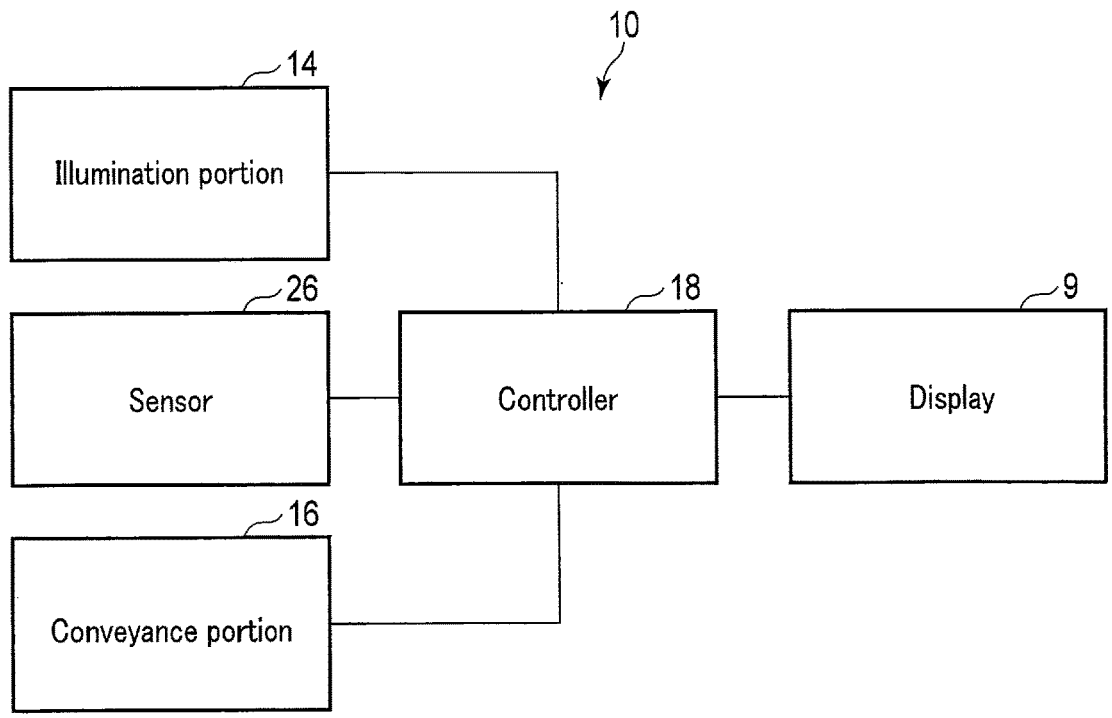
FIG. 10 is a block diagram of the optical inspection apparatus according to the fourth embodiment.

As illustrated in FIG. 10, a controller 18 of the optical inspection apparatus 10 controls an image sensor 26 of the optical imaging apparatus 12, the illumination portion 14, and the conveyance portion 16. States of the image sensor 26 of the optical imaging apparatus 12, the illumination portion 14, and the conveyance portion 16, and images acquired by the image sensor 26 of the optical imaging apparatus 12 can be displayed on a display 9.

The optical imaging apparatus 12 according to the present embodiment has a basic configuration similar to a basic configuration of the optical imaging apparatus 12 according to the first embodiment. The optical imaging apparatus 12 according to the present embodiment includes an image-forming optical portion 22 that has a first optical axis L1, a wavelength selection portion 24, and the image sensor 26.

The conveyance portion 16 can convey a work (object) as an inspection subject not illustrated, by means of the conveyance path 16a, in one direction. A conveyance speed of a work by means of the conveyance path 16a of the conveyance portion 16 depends on a conveyance subject (inspection subject), and is, for example, approximately 7 m/s or less.

In the present embodiment, the wavelength selection portion 24 has a lengthwise direction along a second axis Ay, and is divided into, for example, five different regions in a direction along a first axis Ax. That is to say, in the present embodiment, the wavelength selection portion 24 includes five different wavelength selection regions 24a, 24b, 24c, 24d, and 24e. The five different wavelength selection regions 24a, 24b, 24c, 24d, and 24e are a first wavelength selection region 24a, a second wavelength selection region 24b, a third wavelength selection region 24c, a fourth wavelength selection region 24d, and a fifth wavelength selection region 24e. Therefore, the number of wavelength selection regions of the wavelength selection portion 24 that a first plane crosses is different from the number of wavelength selection regions of the wavelength selection portion 24 that a second plane crosses. Therefore, the wavelength selection portion 24 is an anisotropic wavelength selection opening that is non-isotropic or anisotropic, and has anisotropy. Note that here, it is assumed that the first wavelength selection region 24a, for example, is disposed on the first optical axis L1 of the image-forming optical portion 22.

The image sensor 26 according to the present embodiment is a linear sensor. The image sensor 26 has a lengthwise direction along the second axis Ay, and pixels are linearly arranged along the lengthwise direction. In the first plane where the first axis Ax and the first optical axis L1 extend, the image sensor 26 can be considered as a point. In the present embodiment, five different wavelengths are used, and each pixel of the image sensor 26 receives five light beams of different combinations of the five different wavelengths by means of separate respective color channels, and identifies each of the light beams, based on a hue (component ratio of the color channels). For example, blue light of a wavelength of 450 nm is received by only a color channel referred to as a B channel, green light of a wavelength of 550 nm is received by only a color channel referred to as a G channel, and red light of a wavelength of 650 nm is received by only a color channel referred to as an R channel.

Note that in general, if the image sensor 26 includes three channels of R, G, and B, the image sensor 26 can identify a difference between spectra (difference between hues), based on a component ratio of the three channels of R, G, and B. Therefore, even if the number of multi-wavelength opening regions (wavelength selection regions) is larger than the number of image channels of the image sensor 26, the image sensor 26 functions.

That is to say, in the present embodiment, each pixel of the image sensor 26 includes three or more color channels.

Based on an image acquired by the image sensor 26, the controller 18 acquires information about scattering on an object surface, based on the number of significant color channels (the number of color channels a pixel value of each of which is equal to or larger than a value not buried by noise or surrounding illumination).

The illumination portion 14 illuminates the conveyance path 16a of a work, in the shape of a line that is long in a direction parallel to the second axis Ay. The illumination portion 14 illuminates a region R of the conveyance path 16a, in the shape of a line, perpendicularly or substantially perpendicularly to a conveyance direction of the conveyance path 16a. Illumination light of the illumination portion 14 is, for example, white light, and is not single-color light. Alternatively, illumination light of the illumination portion 14 may be white light obtained by multiplexing single-color light. A shape of illumination of the illumination portion 14 is not limited to the above, and may be anything. Further, the line-shaped illumination may actually be a rectangle that has a large aspect ratio. It is assumed that a direction along a lengthwise direction of the line-shaped illumination is a fourth axis A4, and is parallel to the second axis Ay. It is assumed that a direction that is from the illumination portion 14 and perpendicularly crosses the fourth axis A4 is a second optical axis L2. Further, it is assumed that a direction that perpendicularly crosses both the second optical axis L2 and the fourth axis A4 is a third axis A3.

It is assumed that a plane where the second optical axis L2 and the third axis A3 extend is a third plane. It is assumed that the first plane is parallel to the third plane. It is assumed that a plane where the second optical axis L2 and the fourth axis A4 extend is a fourth plane.

It is assumed that a light beam group emitted from the illumination portion 14 is substantially parallel light in the third plane, and is diffused light in the fourth plane.

Note that a position relationship between the illumination portion 14 and the optical imaging apparatus 12 is set in such a manner that a light beam having the first wavelength that is in the third plane emitted from the illumination portion 14 and that regularly passes (regularly reflects) on a surface of a work (object surface) on the conveyance path 16a illuminated with the light beam from the illumination portion 14, passes through the first wavelength selection region 24a of the wavelength selection portion 24, and is incident on the image sensor 26. That is to say, the illumination portion 14 and the image sensor 26 are disposed in such a manner that a light beam that having the first wavelength that is in the third plane illuminated from the illumination portion 14, that regularly passes on an object illuminated with the light beam from the illumination portion 14, that passes through the first wavelength selection portion 24, that is incident on the image sensor 26, and that is incident on the image sensor 26, has object-side telecentricity at the image sensor 26.

Here, a light beam that is in the first plane and has telecentricity on the object side of the image-forming optical portion 22 reaches the first wavelength selection region 24a. In the present embodiment, the first wavelength selection region 24a allows passing of a light beam of the first wavelength (blue light) through the first wavelength selection region 24a, and shields light beams of a second wavelength (red light), a third wavelength (green light), and the other fourth wavelength and fifth wavelength. The second wavelength selection region 24b allows passing of a light beam of the second wavelength (red light) through the second wavelength selection region 24b, and shields light beams of the first wavelength, the third wavelength, the fourth wavelength, and fifth wavelength. The third wavelength selection region 24c allows passing of a light beam of the third wavelength through the third wavelength selection region 24c, and shields light beams of the first wavelength, the second wavelength, the fourth wavelength, and the fifth wavelength. The fourth wavelength selection region 24d allows passing of a light beam of the fourth wavelength and a light beam of the third wavelength received by R channels of the image sensor 26 through the fourth wavelength selection region 24d, and shields light beams of the first wavelength, the second wavelength, and the fifth wavelength. The fifth wavelength selection region 24e allows passing of a light beam of the fifth wavelength that is not received by any channel of the image sensor 26 through the fifth wavelength selection region 24e, and shields light beams of the first wavelength, the second wavelength, the third wavelength, and the fourth wavelength.

That is to say, a light beam that has passed through the first wavelength selection region 24a is received by B channels of the image sensor 26. A light beam that has passed through the second wavelength selection region 24b is received by R channels of the image sensor 26. A light beam that has passed through the third wavelength selection region 24c is received by G channels of the image sensor 26. Further, light beams that have passed through the fourth wavelength selection region 24d are simultaneously received by the R channels and the G channels. A light beam that has passed through the fifth wavelength selection region 24e is not received by any channel.

It is assumed that a work that has a flat surface, for example, is conveyed. It is assumed that a surface of a work that includes a defect, a foreign matter, or ups and downs of the shape is an abnormal surface, and a surface of a work to the contrary is a standard surface. The wavelength selection regions are formed in such a manner that when light beams from the illumination portion 14 are reflected by a standard surface, the light beams pass through the first wavelength selection region 24a of the wavelength selection portion 24.

Under the configuration described above, an operation principle of the optical inspection apparatus 10 according to the present embodiment will be described.

If a surface of a work is a standard surface, an image imaged by the image sensor 26 as a linear sensor is B channels. That is to say, the image sensor 26 images only light beams of the first wavelength (blue light). Therefore, if the controller 18 determines that only light beams of the first wavelength have been imaged when the controller 18 determines a hue of an image acquired by the image sensor 26, the controller 18 determines that a surface of a work is a standard surface. That is to say, light beams that are emitted from the illumination portion 14 and are in the third plane, receive regular passing from an illuminated object and are traveling to the image sensor 26, and reach the wavelength selection portion 24 do not simultaneously pass through two or more different wavelength selection regions.

On the other hand, if a work surface is an abnormal surface, a light beam direction reflected from the work changes compared with a case of a standard surface. That is to say, if the image sensor 26 as a linear sensor images any of light beams of the second wavelength (red light), the third wavelength (green light), the fourth wavelength, and the fifth wavelength in an imaged image, it can be said that a work surface is an abnormal surface. That is to say, light beams that are emitted from the illumination portion 14 and are in the third plane, do not receive regular passing from an illuminated object and are traveling to the image sensor 26, and reach the wavelength selection portion 24 pass through any of the wavelength selection regions 24b, 24c, 24d, and 24e. Further, light beams that are emitted from the illumination portion 14 and are in the third plane, are diffused by an illuminated object and are traveling to the image sensor 26, and reach the wavelength selection portion 24 simultaneously pass through two or more regions of the different wavelength selection regions 24a, 24b, 24c, 24d, and 24e since the light beams are diffused. Further, a component ratio of color channels of pixels of an imaged image changes according to a surface shape of a work. That is to say, the controller 18 can estimate a surface of a work, based on a value (pixel value) of each of color channels.

Further, the optical imaging apparatus 12 makes, for example, a table of relationships between surface shapes and combinations (component ratios) of pixel values of, for example, three color channels of R, G, and B, and stores the table in memory not illustrated. At this time, the controller 18 collates a component ratio of color channels of each pixel acquired by the image sensor 26 with the table stored in the memory, and thus can measure a surface shape of a surface of a work (object surface).

Especially if the controller 18 determines that two or more channels of three color channels of R, G, and B have been simultaneously imaged by the image sensor 26, that is to say if the number of color channels that have significant values is two or more, the controller 18 determines that a surface of a work is an abnormal surface, and light has been diffused by the abnormal surface. On the other hand, a standard surface is imaged by one color channel of a light beam of the first wavelength (blue light). Therefore, the controller 18 of the optical inspection apparatus 10 can estimate whether a surface of an object (object surface) is an abnormal surface or a standard surface, based on the number of significant color channels.

As described above, the optical inspection apparatus 10 according to the present embodiment can inspect a surface state of an object (work) that is being conveyed, or can measure a surface shape of an object (work) that is being conveyed.

According to the present embodiment, the optical imaging apparatus 12, the optical inspection apparatus 10, and the optical inspection method for acquiring information about an object surface can be provided.

In the present embodiment, an example is described where the optical imaging apparatus 12 described in the first embodiment is used. Instead of the optical imaging apparatus 12 described in the first embodiment, however, the optical imaging apparatus 12 described in the second embodiment, or the optical imaging apparatus 12 described in the third embodiment may be used.

(Modification 1)

Figure 11:
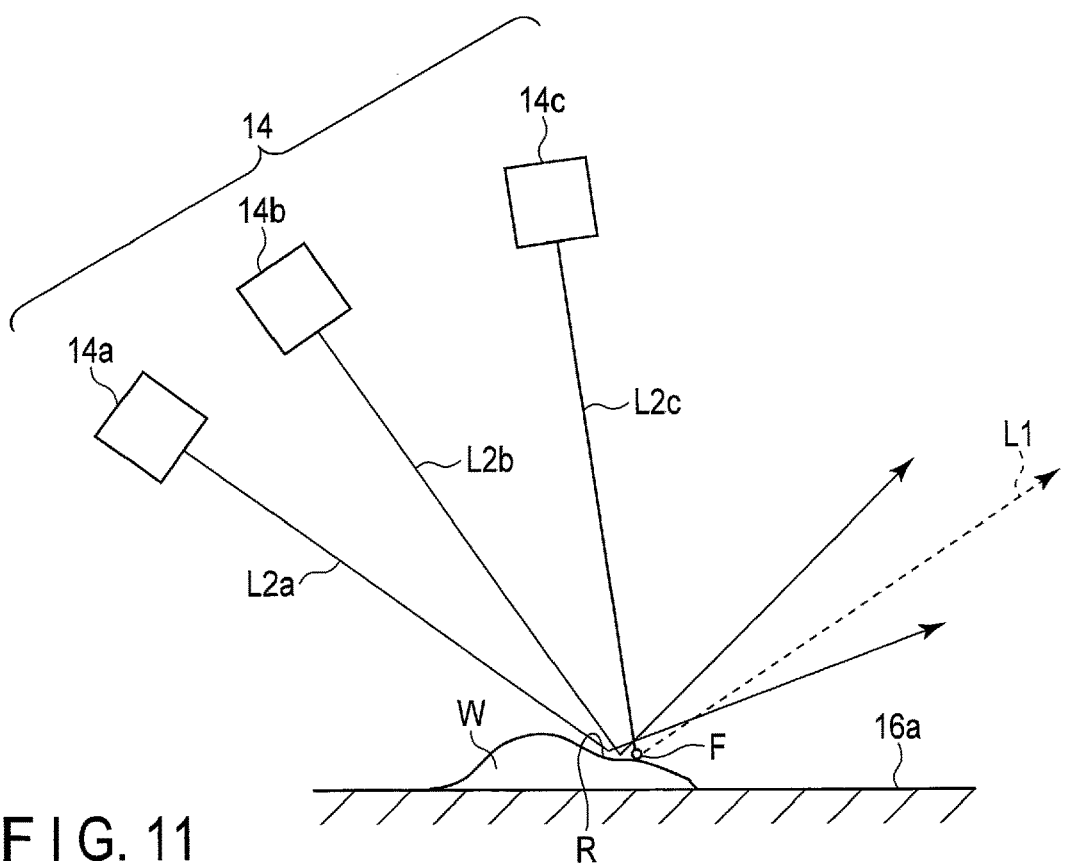
FIG. 11 is a schematic cross-sectional view of an illumination portion of an optical inspection apparatus according to Modification 1 of the fourth embodiment along a first plane.

As illustrated in FIG. 11, an illumination portion 14 includes a plurality of linear illuminations 14a, 14b, and 14c. Light-emitting diodes (LEDs), for example, are used as light sources of the linear illuminations 14a, 14b, and 14c. However, light sources of the linear illuminations 14a, 14b, and 14c are not limited to LEDs and may be lasers of some multiplexed different wavelengths. For example, lasers of wavelengths of 405 nm, 532 nm, and 635 nm are multiplexed using a cold mirror, a hot mirror, or the like to form illumination light. At least two or more of the linear illuminations 14a, 14b, and 14c of the illumination portion 14 may be included.

FIG. 11 is a cross-sectional view that includes a first optical axis L1 and second optical axes L2a, L2b, and L2c of light beams from the linear illuminations 14a, 14b, and 14c. The first linear illumination 14a, the second linear illumination 14b, and the third linear illumination 14c illuminate a region R of a conveyance path 16a, each in the shape of a line, perpendicularly to a conveyance direction of the conveyance path 16a. Regions (illuminated portions) R illuminated by the first linear illumination 14a, the second linear illumination 14b, and the third linear illumination 14c are superimposed on each other. In the present modification, a controller 18 controls the linear illuminations 14a, 14b, and 14c to simultaneously illuminate a superimposed region R of a surface of a work W (object surface). With respect to light beams illuminated by each of the linear illuminations 14a, 14b, and 14c and reflected by a surface of the work W, part of the light beams projected on a cross section illustrated in FIG. 11 become parallel light relative to an image-forming optical portion 22 of an optical imaging apparatus 12. Among light beams from the linear illuminations 14a, 14b, and 14c of the illumination portion 14, part of the light beams that receive regular reflection (regular passing) from a surface of the work W become parallel light parallel to a first plane and a second plane. With respect to light beams illuminated by each of the linear illuminations 14a, 14b, and 14c and reflected by the work W, part of the light beams projected on a plane that perpendicularly crosses a cross section illustrated in FIG. 11 become diffused light relative to the image-forming optical portion 22 of the optical imaging apparatus 12.

If a standard surface of a work W is a mirror surface, light beams with which the work W is illuminated become regular reflection. At this time, reflection directions of the second optical axes L2a, L2b, and L2c of the light beams change according to the shape of the work W. Therefore, a hue of an image acquired by an image sensor 26 of the optical imaging apparatus 12 changes according to a change in the shape based on movement of the work W by a conveyance path 16a. Based on such a change in the hue, the controller 18 of the optical imaging apparatus 12 of an optical inspection apparatus 10 can estimate the shape of a surface of the work W.

If there is a foreign matter F or minute protrusions and recesses of scales close to a wavelength of light on a surface, light beams from the illumination portion 14 are scattered. That is to say, light beams from the first linear illumination 14a, the second linear illumination 14b, and the third linear illumination 14c are diffused and reflected by the foreign matter F. The number of wavelength selection regions of a wavelength selection portion 24 through which the diffused light beams pass increases compared with a case where light beams are reflected by a standard surface. Therefore, the number of significant color channels of the image sensor 26 increases. That is to say, in an image acquired by the image sensor 26 of the optical imaging apparatus 12, the number of significant color channels increases in an abnormal-surface region where there is a foreign matter F, minute protrusions and recesses, or the like. Based on such an increase in the number of significant color channels, the controller 18 of the optical inspection apparatus 10 can inspect a surface of a work W.

Therefore, due to the optical inspection apparatus 10 according to the present modification, a surface of a work can be inspected using the optical imaging apparatus 12 even if the surface of the work has a curved surface.

According to the present modification, the optical imaging apparatus 12, the optical inspection apparatus 10, and the optical inspection method for acquiring information about an object surface can be provided.

(Modification 2)

Figure 12:
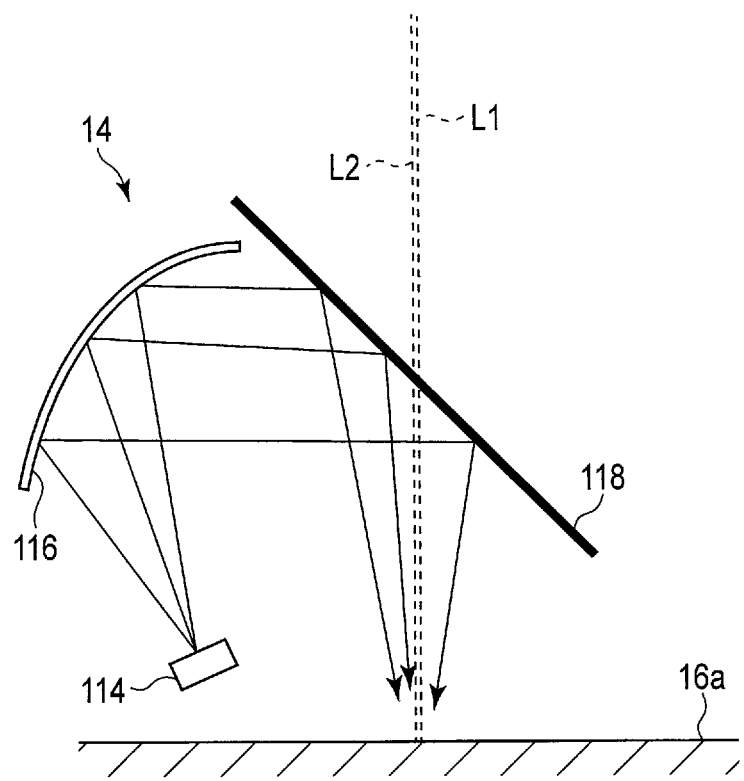
FIG. 12 is a schematic cross-sectional view of an illumination portion of an optical inspection apparatus according to Modification 2 of the fourth embodiment along a first plane.

An illumination portion 14 may include a configuration illustrated in FIG. 12. FIG. 12 is a cross section that includes a first optical axis L1 and a second optical axis L2. The illumination portion 14 includes a light source 114, a concave mirror 116, and a beam splitter 118. It is assumed that the light source 114 is, for example, an LED light source of white color (no single color). It is assumed that the concave mirror 116 is, for example, an elliptical mirror.

In the present modification, an optical imaging apparatus 12 is disposed, for example, above the beam splitter 118 of the illumination portion 14 in FIG. 12. In the present modification, the second optical axis L2 of the illumination portion 14 and the first optical axis L1 of the optical imaging apparatus 12 are made parallel by means of the beam splitter 118. That is to say, part of light beams emitted from the light source 114 are made to become parallel light parallel to the first optical axis L1, using the concave mirror 116 and the beam splitter 118. Illumination made parallel to the optical axis L1 of imaging in this way is referred to as coaxial epi-illumination. The illumination is condensed light in, for example, the cross section illustrated in FIG. 12. On the other hand, the illumination is diffused light in a plane that perpendicularly crosses the cross section.

An image acquired by an image sensor 26 of an optical imaging apparatus 12 has different hues according to a change in a shape of an object (not illustrated). Based on such a change in the hue, the controller 18 of an optical inspection apparatus 10 can estimate a shape of a surface of a work (object surface). Further, in an image acquired by the optical imaging apparatus 12, the number of significant color channels increases in an abnormal-surface region where there is a foreign matter F, minute protrusions and recesses, or the like. Based on such an increase in the number of significant color channels, a surface of a work W can be inspected.

According to the present modification, the optical imaging apparatus 12, the optical inspection apparatus 10, and the optical inspection method for acquiring information about an object surface can be provided.

According to at least one of the embodiments described above, the optical imaging apparatuses 12, the optical inspection apparatuses 10, and the optical inspection methods for acquiring information about an object surface can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical imaging apparatus comprising:
    an image-forming optical portion having a lens that forms an image of an object by means of light beams that include a first wavelength and a second wavelength different from the first wavelength, the image-forming optical portion defining a first axis that intersects a first optical axis of the image-forming optical portion, and defining a second axis that intersects the first optical axis of the image-forming optical portion and the first axis;
    a first wavelength selection portion having wavelength selection regions, the wavelength selection regions being an anisotropic wavelength selection opening having a different distribution of the wavelength selection regions depending on a direction along the first axis and a direction along the second axis, a first light beam having the first wavelength, the first light beam having object-side telecentricity in an axis direction of the first axis of the image-forming optical portion and having object-side non-telecentricity in an axis direction of the second axis, a second light beam having the second wavelength, the second light beam having object-side non-telecentricity in the axis direction of the first axis and the axis direction of thesecond axis, the first wavelength selection portion simultaneously allowing passing of the first light beam and the second light beam; and an imaging portion that is configured to simultaneously acquire an image of the first light beam and the second light beam.

2. The optical imaging apparatus according to claim 1, wherein the wavelength selection regions of the first wavelength selection portion includes:

a first wavelength selection region which is disposed in a focal plane of the image-forming optical portion; and a second wavelength selection region which is aligned offset with the first wavelength selection region in the axis direction of the first axis, when it is assumed that a plane where the first optical axis and the first axis extend is a first plane, and a plane where the first optical axis and the second axis extend is a second plane, among light beams from the object to the imaging portion, in the first plane, a light beam that reaches the first wavelength selection region has object-side telecentricity, a light beam that reaches the second wavelength selection regionas object-side non-telecentricity, and in the second plane, a light beam that reaches the first wavelength selection region that is away from the first optical axis has object-side non-telecentricity.

3. The optical imaging apparatus according to claim 1, comprising a controller that is configured to acquire a direction of a light beam relative to the first axis, based on a hue acquired by the imaging portion.

4. The optical imaging apparatus according to claim 3, wherein each pixel of the imaging portion includes two or more color channels, and the controller is configured to acquire information about scattering on an object surface, based on a number of the color channels significant in the controller.

5. The optical imaging apparatus according to claim 1, wherein the imaging portion is a linear sensor in which pixels are linearly disposed.

6. The optical imaging apparatus according claim 5, wherein when it is assumed that a plane where the first optical axis and the first axis extend is a first plane, and a plane where the first optical axis and the second axis extend is a second plane, the linear sensor has a lengthwise direction in a direction parallel to the second plane.

7. The optical imaging apparatus according to claim 1, comprising:

a polarizing beam splitter that is disposed between the image-forming optical portion and thefirst wavelength selection portion and splits a polarized-light component into a first polarized-light component and a second polarized-light component; and a second wavelength selection portion disposed on a light path of a light beam split by the polarizing beam splitter, wherein:

a first polarized-light component is made to be incident on the first wavelength selection portion, and a second polarized-light component different from the first polarized-light component is made to be incident on the second wavelength selection portion.

8. The optical imaging apparatus according to claim 1, wherein the first wavelength selection portion is disposed between the image-forming optical portion and the imaging portion.

9. The optical imaging apparatus according to claim 1, wherein the first wavelength selection portion is disposed closer to the object as an inspection subject than the image-forming optical portion is disposed.

10. An optical inspection apparatus comprising:

the optical imaging apparatus according to claim 1; and an illumination portion that illuminates the object with light beams that include the first wavelength and the second wavelength.

11. The optical inspection apparatus according to claim 10, wherein the illumination portion includes a second optical axis, and when it is assumed that a direction that crosses the second optical axis is a third axis, a direction that crosses the second optical axis and the third axis is a fourth axis, a plane where the second optical axis and the third axis extend is a third plane, and a plane where the second optical axis and the fourth axis extend is a fourth plane, light beams emitted from the illumination portion are substantially parallel light in the third plane and are diffused light in the fourth plane.

12. The optical inspection apparatus according to claim 11, wherein the first wavelength selection portion includes:

a first wavelength selection region that allows passing of the first light beam through the first wavelength selection region and shields the second light beam; and a second wavelength selection region that is aligned offset with the first wavelength selection region in the axis direction of the first axis, shields the first light beam, and allows passing of the second light beam through the second wavelength selection region, and a position relationship between the illumination portion and the imaging portion is set in such a manner that a light beam having the first wavelength that is in the third plane illuminated from the illumination portion and that regularly passes on an object surface illuminated with the light beam from the illumination portion, passes through the first wavelength selection region, and is incident on the imaging portion of the wavelength selection portion, and is incident on the imaging portion.

13. The optical inspection apparatus according to claim 11, wherein a position relationship between the illumination portion and the imaging portion is set in such a manner that a light beam having the first wavelength that is emitted from the illumination portion that is in the third plane illuminated from the illumination portion, that regularly passes on an object surface illuminated with the light beam from the illumination portion, that passes through the first wavelength selection portion, that is incident on the imaging portion, and that is incident on the imaging portion, has object-side telecentricity at the imaging portion.

14. The optical inspection apparatus according to claim 11, wherein a light beam that is in the third plane illuminated from the illumination portion that regularly passes from the object illuminated, that reaches the first wavelength selection portion, and that travels to the imaging portion, do not simultaneously pass through two or more different wavelength selection regions.

15. The optical inspection apparatus according to claim 10, comprising at least two or more of the illumination portion,
wherein:
when it is assumed that a plane where the first optical axis and the first axis extend is a first plane, and a plane where the first optical axis and the second axis extend is a second plane,
among light beams from the illumination portion, part of the light beams that receive regular passing from the object become parallel light parallel to the first plane and the second plane.

16. The optical inspection apparatus according to claim 10, comprising a controller that is configured to image a surface of the object illuminated by the illumination portion, by means of the imaging portion to acquire an image, and configured to inspect a surface slate of the object or measures a surface shape of the object.

17. An optical inspection apparatus comprising:
the optical imaging apparatus according to claim 1;
a conveyance portion that is configured to convey the object in a predetermined direction; and
a controller that is configured to image a surface of the object that is being conveyed, by means of the imaging portion to acquire an image, and configured to inspect a surface state of the object or measures a surface shape of the object.

18. An optical inspection apparatus according to claim 17, comprising an illumination portion that is configured to illuminate the object with light beams that include the first wavelength and the second wavelength.

19. An optical inspection method comprising:
imaging a first light beam that has a first wavelength and a second light beam that has a second wavelength different from the first wavelength at an imaging portion, by means of an image-forming optical portion having a lens passing through the image-forming optical portion and a wavelength selection portion from an object; and
simultaneously acquiring an image of the first light beam passed through the wavelength selection portion and an image of the second light beam passed through the wavelength selection portion by means of the imaging portion,
the first beam having object-side telecentricity in an axis direction of a first axis that crosses a first optical axis of the image-forming optical portion and having object-side non-telecentricity in an axis direction of a second axis that crosses the first optical axis and the first axis, and
the second light beam having object-side non-telecentricity in the axis direction of the first axis and the axis direction of the second axis.

20. An optical inspection method comprising:
incident of a first light beam having a first wavelength and a second light beam having a second wavelength different from the first wavelength on an object;
simultaneously passing the first light beam and the second light beam through a wavelength selection portion,
the first light beam having object-side telecentricity in the axis direction of the first axis that crosses the first optical axis of an image-forming optical portion having a lens and has object-side non-telecentricity in the axis direction of the second axis that crosses the first optical axis and the first axis, and
the second light beam having object-side non-telecentricity in the axis direction of the first axis and the axis direction of the second axis;
forming images of the first light beam and the second light beam that have been allowed to pass through the wavelength selection portion by means of the image-forming optical portion; and
acquiring the images of the first light beam and the second light beam that have been allowed to pass through the wavelength selection portion by means of an imaging portion.

* * * * *

UNITED STATES PATENT AND TRADEMARK OFFICE
CERTIFICATE OF CORRECTION

PATENT NO. : 11,774,369 B2
APPLICATION NO. : 17/446610
DATED : October 3, 2023
INVENTOR(S) : Hiroshi Ohno It is certified that error appears in the above-identified patent and that said Letters Patent is hereby corrected as shown below:

In the Claims

Claim 1, Column 23, Line 14, "thesecond" should read as --the second--.

Claim 2, Column 23, Line 39, "regionas" should read as --region as--.

Claim 7, Column 24, Line 2, "thefirst" should read as --the first--.

Signed and Sealed this
Sixteenth Day of January, 2024

Katherine Kelly Vidal
*Director of the United States Patent and Trademark Office*